(12) United States Patent
De Baere

(10) Patent No.: US 10,663,370 B2
(45) Date of Patent: May 26, 2020

(54) EFFECTIVE STRUCTURAL HEALTH MONITORING

(71) Applicant: VRIJE UNIVERSITEIT BRUSSEL, Brussels (BE)

(72) Inventor: Dieter De Baere, Liedekerke (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 26 days.

(21) Appl. No.: 14/889,461

(22) PCT Filed: May 6, 2014

(86) PCT No.: PCT/EP2014/059273
§ 371 (c)(1),
(2) Date: Nov. 6, 2015

(87) PCT Pub. No.: WO2014/180870
PCT Pub. Date: Nov. 13, 2014

(65) Prior Publication Data
US 2016/0091388 A1 Mar. 31, 2016

Related U.S. Application Data

(60) Provisional application No. 61/819,830, filed on May 6, 2013.

(30) Foreign Application Priority Data

Aug. 18, 2013 (EP) .................................... 13180793
Jan. 31, 2014 (EP) .................................... 14153571

(51) Int. Cl.
*G01M 3/26* (2006.01)
*G01M 5/00* (2006.01)
(Continued)

(52) U.S. Cl.
CPC ............ *G01M 3/26* (2013.01); *G01M 5/0033* (2013.01); *B33Y 10/00* (2014.12); *B33Y 50/02* (2014.12)

(58) Field of Classification Search
CPC ....... G01M 3/26; G01M 5/0033; B33Y 10/00; B33Y 50/02
(Continued)

(56) References Cited

U.S. PATENT DOCUMENTS 3,667,862 A * 6/1972 Parr ..................... B64C 27/007
416/61
3,803,485 A 4/1974 Crites et al.
(Continued)

FOREIGN PATENT DOCUMENTS

CN 1054916 C 7/2000
DE 102009027807 A1 3/2011

OTHER PUBLICATIONS

Devriendt et al., "An Operational Modal Analysis Approach Based on Parametrically Identified Multivariable Transmissibilities," Mechanical Systems and Signal Processing, 2010, pp. 1250-1259, vol. 24.
(Continued)

*Primary Examiner* — Natalie Huls
*Assistant Examiner* — Monica S Young
(74) *Attorney, Agent, or Firm* — Workman Nydegger

(57) ABSTRACT

A system is described for performing structural health monitoring of an object under study. The system comprises a hollow cavity structure comprising one or more cavities obtained using additive manufacturing. The cavity structure is sealable from its environment and forms an integral part of the object under study. The cavity structure furthermore is connectable to a pressure sensor for sensing a pressure in the cavity structure.

13 Claims, 15 Drawing Sheets

(51) Int. Cl.
*B33Y 10/00* (2015.01)
*B33Y 50/02* (2015.01)

(58) Field of Classification Search
USPC .............................................................. 73/40
See application file for complete search history.

(56) References Cited

U.S. PATENT DOCUMENTS

| | | | | | |
|---|---|---|---|---|---|
| 4,104,906 | A | * | 8/1978 | Oertle | G01L 1/22 116/70 |
| 4,145,915 | A | * | 3/1979 | Oertle | G01M 3/26 73/37 |
| 4,179,940 | A | * | 12/1979 | Oertle | G01M 5/0033 73/799 |
| 5,531,122 | A | * | 7/1996 | Chatham | G01B 5/30 340/438 |
| 5,770,794 | A | * | 6/1998 | Davey | B64C 27/007 73/37 |
| 5,859,759 | A | * | 1/1999 | Moriyama | G01L 19/0084 338/42 |
| 6,093,330 | A | * | 7/2000 | Chong | B81C 1/00047 216/11 |
| 8,353,197 | B2 | * | 1/2013 | Laxton | G01M 3/26 73/37 |
| 8,777,863 | B2 | * | 7/2014 | Piaget | A61B 5/0031 600/481 |
| 9,031,796 | B2 | * | 5/2015 | Doyle | B64C 27/007 702/35 |
| 2001/0022207 | A1 | * | 9/2001 | Hays | B81C 1/00269 148/518 |
| 2004/0187946 | A1 | * | 9/2004 | Herrington | B23D 21/04 138/112 |
| 2007/0107496 | A1 | * | 5/2007 | Davey | G01M 3/2869 73/38 |
| 2008/0246180 | A1 | * | 10/2008 | Appleby | B23P 15/246 264/220 |
| 2010/0281952 | A1 | * | 11/2010 | Laxton | G01M 3/3263 73/40 |
| 2011/0125234 | A1 | * | 5/2011 | Kulstad | A61F 7/12 607/105 |
| 2012/0065937 | A1 | * | 3/2012 | de Graff | G01D 9/005 702/187 |
| 2012/0174680 | A1 | * | 7/2012 | Wade | G01L 19/0038 73/721 |
| 2012/0189863 | A1 | * | 7/2012 | Houck | B81B 3/0059 428/596 |
| 2012/0270354 | A1 | * | 10/2012 | Hooper | G01L 19/141 438/51 |
| 2013/0050228 | A1 | * | 2/2013 | Petersen | H01L 23/053 345/501 |
| 2013/0055821 | A1 | * | 3/2013 | Bentley | G01L 9/0054 73/721 |
| 2013/0079693 | A1 | * | 3/2013 | Ranky | H01L 41/314 602/28 |
| 2013/0342186 | A1 | * | 12/2013 | Pagani | G01M 5/0083 324/71.1 |
| 2015/0208539 | A1 | * | 7/2015 | Blunier | H01L 23/08 312/223.1 |
| 2016/0103031 | A1 | * | 4/2016 | Tham | B33Y 70/00 73/724 |
| 2019/0003871 | A1 | * | 1/2019 | Westmoreland, III | G01F 23/284 |

OTHER PUBLICATIONS

European Search Report for corresponding European Application No. 13180793.5, dated Feb. 25, 2014.
Finlayson et al., "Health Monitoring of Aerospace Structures with Acoustic Emission and Acousto-Ultrasonics," Insight, Mar. 30, 2001, pp. 155-158, vol. 43, No. 3.
Geiger, "State-of-the-Art in Leak Detection and Localisation," Pipeline Technology 2006 Conference, URL: www.pipeline-conference.com/sites/default/files/papers/321%20Gieger.pdf, Dec. 2006, pp. 1-25.
Guillaume et al., "An Inverse Method for the Identification of Localized Excitation Sources," Proceedings of the Society of Photo-Optical Instrumentation Engineers (SPIE), 2002, pp. 1382-1388, vol. 4753.
International Search Report for corresponding International PCT Application No. PCT/EP2014/059273, dated Aug. 12, 2014.
Pintelon et al., "Identification of Transfer Functions with Time Delay and Its Application to Cable Fault Location," IEEE Transactions on Instrumentation and Measurement, Jun. 1990, pp. 479-484, vol. 39, No. 3.
Schijve, "Fatigue of Structures and Materials in the 20th Century and the State of the Art," International Journal of Fatigue, 2003, pp. 679-702, vol. 25.
Wilhite,"Estimating the Risk of Technology Development," Workshop Proceedings, NASA Jet Propulsion Laboratory , JPL-Publ-2004-011, Jun. 2004, pp. 14-30.
Australian Office Action from AU Application No. 2014264623, dated Dec. 12, 2017.
Chinese Office Action from CN Application No. 201480038722.4, dated Aug. 21, 2017.

* cited by examiner (a)  (b)

(a)  (b)  (c)

EFFECTIVE STRUCTURAL HEALTH MONITORING

FIELD OF THE INVENTION

The invention relates to the field of structural health monitoring. More specifically it relates to robust systems and methods for reliably monitoring of the structural health of critical zones or components of an object under study.

BACKGROUND OF THE INVENTION

Structural health monitoring (SHM) is a collective term for technologies that are used to monitor the structural integrity of structures or identify structural damage by permanently attached sensors. In the past SHM techniques have been investigated for example for the aeronautical industry. This sector is eager to integrate SHM systems in their products due to the fact of a continuous search for enhancing the safety level of their products and reduction of the direct operating costs for operating an aircraft. Currently visual inspections and a large number of non-destructive evaluation techniques with a local inspection capability are available for the industry. In the last 3 decades numerous SHM techniques have been investigated with the focus on damage identification in components on a more global character. The basic scientific challenge for SHM remains to detect damage, which is a very local phenomenon by measuring global responses parameters of a structure. Next to this primary scientific challenge some other big barriers block the industry from applying SHM systems more in particular their effectiveness in practice and durability under in-service conditions.

These challenges are some of the major blocking points which have prevented the introduction of SHM technologies in real life structures/applications with exception of condition monitoring of rotary machinery. The maturity of different evolving SHM systems has been expressed in technological readiness levels by the large industrial players (e.g. Airbus) and governmental research organisation (e.g. NASA). The definitions vary slightly for the different organisations but the major philosophy remains the same. An example is illustrated in FIG. 1, as described by Wilwhite A. W. et al. in Workshop Proceedings, NASA Jet Propulsion Laboratory (JPL-Pub1-2004-011) (June) (2004), pp. 14-30, a detailed description of the technological readiness levels indicated being described in detail in this reference.

Fatigue is an important damage phenomenon that affects the structural integrity of a structural component/applications. Fatigue has been approached in many ways:

In the first half of 20th century, cyclic slip was considered to be essential for micro-crack initiation and it was also associated with cyclic dislocation movements. Micro-cracks usually start at the free surface of the material, also in unnotched objects under study with a nominally homogeneous stress distribution tested under cyclic tension. The restrain on cyclic slip is lower than inside the material because of the free surface at one side of the surface material. It can be concluded that fatigue crack initiation is a surface phenomenon. Fatigue life under cyclic loading consisted of two phases: crack initiation life and crack growth period until failure. The initiation period typically may start with cyclic slip, resulting in crack nucleation, which further results in micro crack growth. The first phase may cover a large part of the fatigue life under stress amplitudes just above the fatigue limit but for higher stress amplitudes the crack growth period is essential for the fatigue life. The crack growth period, which is the second phase, typically consists of macro crack growth ending in final failure. The difference between the two phases is of great importance because several surface conditions do affect the initiation period but not the crack growth period (surface roughness, surface damage, surface residual stresses, surface treatments). Corrosive environments and tribological phenomena can also affect initiation and crack growth period but in different way for the two periods. The stress concentration factor $K_t$ is the important parameter for predictions on crack initiation, the stress intensity factor K is used for predictions on crack growth, while the fracture toughness $K_{Ic}$ is characteristic for the final failure.

Fatigue properties can also be described in terms of a Wöler Curve (S-N curve). A S-N curve is derived from a number of fatigue tests at different stress levels, the fatigue life N is plotted on a logarithmic scale in the horizontal direction and the stress amplitude on a linear scale in the vertical direction. As can be seen in FIG. 2, available from J. Schijve, "Fatigue of structures and materials in the 20th century and the state of the art," International Journal of Fatigue, vol. 25, no. 8, pp. 679-702, August 2003, for low stress amplitudes the curve exhibited a lower limit which implies that the failure has not occurred even after a high number of load cycles. The horizontal asymptote of the S-N curve is called the fatigue limit. At the upper side of the S-N curve, where the large stress amplitudes are, another horizontal asymptote appears. If failure did not occur in the first cycle, the fatigue life could be several hundreds of cycles. The 'low-cycle fatigue' area implies that macro plastic deformation occurs in every cycle. On the other hand, at lower stress amplitudes macro plastic deformation does not occur and the fatigue phenomenon is called as 'high-cycle fatigue'.

Besides fatigue, the structural integrity of objects can also be impacted by wear (or tribological) phenomena. These phenomena are sometimes interrelated. Wear phenomena can play an important role for structural health of objects and therefore need to be monitored.

There is still room for systems and methods for structural health monitoring of objects, whereby the structural health monitoring system is reliable and robust and is not penalizing the useful physical integrity of the object under study.

SUMMARY OF THE INVENTION

It is an object of the present invention to provide efficient methods and systems for structural health monitoring.

It is an advantage of embodiments of the present invention that systems and methods are provided for checking fatigue initiation failure mode and/or fatigue growth mode and/or fatigue critical failure mode at component level. It is an advantage of embodiments of the present invention that systems and methods are provided which also allow the indication of wear levels. It is an advantage of embodiments of the present invention that condition based monitoring can be performed as the different levels of fatigue can be checked and/or monitored. In view thereof, embodiments of the present invention also allow good planning of maintenance, repair and overhaul tasks.

It is an advantage of embodiments of the present invention that systems and methods are provided which allow checking and/or monitoring of crack growth can be performed in situ, even during use of the objects. The latter also results in the fact that inspection and maintenance does not or does only limited results in downtime of the object or of the device the object is used in. In other words, using embodiments of the present invention, there can be a high or increased availability of structures or machines that are checked and/or monitored. Furthermore, it is an advantage of embodiments of the present invention that a highly robust solution is obtained, as the system for checking and/or monitoring can be fully integrated.

It is advantage of embodiments of the present invention that structural health monitoring is obtained allowing inspection of large zones or complete components with one sensor or a limited number of sensors.

It is an advantage of embodiments of the present invention that the structural health monitoring systems can make use of reliable conventional pressure sensors.

It is an advantage of embodiments of the present invention that in view of the possibility of accurate planning of maintenance and repair, in view of "online" checking and/or monitoring—i.e. checking and/or monitoring during use—and/or in view of the good accuracy for checking and/or monitoring, the direct operational cost can be limited or reduced compared to other inspection and/or monitoring techniques.

It is an advantage of embodiments of the present invention that systems and methods are provided that reduce inspection and maintenance costs. It is an advantage of embodiments of the present invention that the inspection time can be short and the inspection can be done remotely.

It is an advantage of embodiments of the present invention that systems and methods are provided that result in a high safety level for highly critical applications.

It is an advantage of embodiments of the present invention that systems and methods are provided that allow testing new mechanical structures, e.g. having a reduced weight, being made of a new material, being made using new production methods, being made according to a new design, etc. with only a limited risk as the structural integrity, wear or fatigue behaviour can be accurately and continuously monitored in operation.

It is an advantage of embodiments of the present invention that checking and monitoring can be performed by measurement of a straight forward physical quantity and allows an easy interpretation of the results with a low amount of post processing.

It is an advantage of embodiments of the present invention that one area or even more areas can be accurately monitored using a single sensor.

The above object is obtained using a method and/or system according to an embodiment of the present invention.

It is an advantage of embodiments of the current invention that the hollow structure, a structure wherein a length direction varies in at least a two dimensional or three dimensional space, can be designed such that the physical integrity of the object under study is not or only limitedly affected by the presence of the three dimensional hollow network structure. As such it is also an advantage of embodiments of the present invention that the hollow network structure does not or only slightly influences the crack initiation behavior.

It is an advantage that additive manufacturing technologies such as e.g. layer-wise laser cladding and selective laser melting etc. and hybrid technologies of additive manufacturing combined with subtractive manufacturing are enabling technologies for the current invention.

It is an advantage of embodiments of the present invention that the pressure sensors used can be mounted on a maintainable position.

It is an advantage of embodiments of the present invention that little or no additional components are required for introducing the health monitoring system in the component. It is an advantage of embodiments of the present invention that the little components required can be easily installed and/or maintained.

It is an advantage of embodiments of the present invention that the system is robust.

Additive manufacturing technologies such as layer-wise laser cladding and selective laser melting etc. and hybrid technologies of additive manufacturing combined with subtractive manufacturing overcome production problems.

The present invention relates to a system for performing structural health monitoring of an object under study, the system comprising a hollow cavity structure comprising one or more cavities obtained using additive manufacturing, the cavity structure, being inherently sealed or sealable from its environment, optionally with the exception of the locations where pressure sensors or connections thereto are positioned, or sealable from its environment and forming an integral part of the object under study, the cavity structure being furthermore connectable to a pressure sensor for sensing at least one pressure inside the cavity structure. It is an advantage of embodiments of the present invention that structural health monitoring can be performed in an accurate manner at component level. The sealed or sealable volume may be provided with additional valves, allowing the cavity to be connected to an external pressure level. Pressure sensors also may be referred to as pressure transducers. Using additive manufacturing may comprise that at least additive manufacturing is used, i.e. additive manufacturing may be combined with other techniques.

It is an advantage of embodiments of the present invention that the sealed structure acts as a physical memory, allowing to detect the integrated effect of the occurred events, even when the pressure sensor is not active during the occurrence of the events. As the occurrence of events can be determined based on integrated effects, no continuous data collection is required.

The hollow cavity structure may be such that at least one cavity of the hollow cavity structure can be described as a volume being defined by sweeping an area, defined by a closed two dimensional curve, along at least one path, so that the path passes perpendicularly through the plane in which the closed two dimensional curve is defined, with the path propagating in at least a two dimensional space. The path may thus remain in a plane. The path may be a center line or a center curve. The length direction of the cavity thus may extend substantially in two directions. The path may pass through the centroid of the closed two dimensional section. In some embodiments, the area can vary arbitrarily for each point of the path. In some embodiments, the area may vary in a number of points of the path, e.g. in at least one or at least two points.

In some embodiments, the hollow cavity structure may be essentially extending in one direction, whereby the cross-section perpendicular to this direction may vary between at least two points along said one direction.

The hollow cavity structure may be such that at least one cavity of the hollow cavity structure can be described as a volume being defined by sweeping an area, defined by a closed two dimensional curve, along at least one path, so that the path passes perpendicularly through the plane in which the closed two dimensional curve is defined, with the path propagating in an at least three dimensional space. The path may pass through the centroid of the closed two dimensional section. In some embodiments, the area can vary arbitrarily for each point of the path. In some embodiments, the area may vary in a number of points of the path, e.g. in at least one or at least two points.

In some embodiments, the hollow cavity structure may be a hollow cavity structure varying along a length direction thereof at least in a two dimensional way, wherein at least one cavity comprises at least two distinct positions along a length direction of said cavity a direction variation of the cavity. It is an advantage of embodiments according to the present invention that easy and accurate manufacturing of an integrated cavity structure can be obtained, resulting in an accurate cavity structure thus allowing accurate checking and/or monitoring, without influencing the object to be checked too significantly.

The hollow cavity structure may be a hollow cavity structure varying along a length direction thereof in a three dimensional way, the structure comprising a network of cavities. The hollow cavity structure may comprise at least one cavity being curved along a length direction thereof. It is an advantage of embodiments according to the present invention that a complex hollow cavity structure can be implemented, allowing to check and/or monitor fatigue at different points in the component.

The network of cavities furthermore may comprise at least one valve for isolating a part of the cavities in the hollow cavity structure. It is an advantage of embodiment according to the present invention that different locations in an object can be checked and/or monitored accurately using the same cavity structure, thus allowing accurate localization of fatigue and more efficient maintenance.

The hollow cavity structure may be filled with a fluidum at under- or overpressure. It is an advantage of embodiments of the present invention that the structural health monitoring can be performed by mere pressure sensing of a fluidum in a cavity.

The system furthermore may comprise a pressure sensor connectable to the cavity structure for sensing a pressure in the cavity structure.

The system may comprise a processing unit adapted for receiving measurement signals representative of a physical parameter of the fully integrated hollow cavity structure and for processing said measurement signals for detecting whether or not wear or cracks have occurred in the object under study. It is an advantage of embodiments of the present invention that a conventional pressure sensor can be used for assisting in structural health monitoring.

The system may comprise said processing unit, wherein the measurement signals are pressure induced signals and wherein the processing unit may be adapted for processing said pressure induced signals such as to detect pressure changes in the hollow cavity structure, and for deriving from said pressure changes whether or not wear or cracks have occurred in the object under study.

The processing unit may be adapted for receiving data of acoustic emission signals from the hollow cavity structure or structure itself and for deriving from said data whether or not wear or cracks have occurred in the object under study.

The processing unit may be adapted for receiving ultrasonic wave data of ultrasonic waves passing over the surfaces of the hollow cavity structure and for deriving from said ultrasonic wave data whether or not wear or cracks have occurred in the object under study. It is an advantage of embodiments of the present invention that alternative techniques—alternative to mere pressure sensing—can be used for assisting in structural health monitoring. In advantageous embodiments, techniques can be combined resulting in a more accurate characterisation of fatigue, wear or corrosion.

The processing unit may be adapted for evaluating data representative for high frequency signals of the acoustic emission signals for deriving whether or not wear or cracks have occurred in the object under study. Said data of acoustic emission signals may be used for localizing wear or a crack in the object under study. It is an advantage of embodiments of the present invention that not only detection but also localization of the crack can be obtained using embodiments of the present invention.

It is an advantage of embodiments of the present invention that alternative techniques—alternative to mere pressure sensing—can be used for assisting in structural health monitoring. In advantageous embodiments, techniques can be combined resulting in a more accurate characterisation of fatigue.

The cavities of the system may comprise a liquid penetrant for visualizing wear or cracks using the naked eye and/or an imaging system. Alternatively, cavities of the system also may comprise a liquid penetrant for identifying wear or cracks using another detection method, e.g. by detecting a particular smell of the liquid penetrant. It is an advantage of embodiments of the present invention that robust systems are obtained. The latter is caused by its integrated character and protection with respect to environmental and operational conditions.

Conventional liquid penetrant inspection is a non-destructive inspection/testing method which is typically done in the following manner. A liquid with a high surface wetting characteristics is applied on the external surface of a component under test. The penetrant penetrates into surface cracks via mainly via capillary action and some other mechanisms. The penetrant is applied typically a couple of minutes, this time period is called the dwell time. Afterwards the excess penetrant is removed from the external surface. Afterwards a developer is applied on the external surface to pull the trapped penetrant back. The main difference in embodiments of the present invention is the fact that the liquid penetrant is in the internal cavities. This has the following advantages compared to conventional liquid penetrant inspections: there are less inspection steps due to the fact that the liquid penetrant is already in the component. Components with rough external surfaces or with applied coatings that prevent the penetrant form entering can currently not be inspected with the conventional method. Nowadays penetrant with different sensitivities exist, it is up to the inspector to choose which penetrant he wants to use for which application. This selection always needs to balance between sensitivity and preventing false detections or non-relevant indications due to surface roughness for example, it is also important to balance due to the fact that defect indications become distinguishable as the background "noise" level increases with the sensitivity. It is an advantage in our application that this trade-off doesn't have to be made. It is also a lot easier to interpret the results of embodiments of the present invention that false indication can be prevented due to the fact that the penetrant is on the inside of the component. The conventional liquid penetrant methods are described in ISO 3452-1 up to ISO34526 or the ASTM E 1417 and ASTM E 165.

The present invention also relates to a method for manufacturing an object for which structural health monitoring is to be applied, the method comprising defining and obtaining information regarding a position, dimension, shape and orientation of a hollow cavity structure in the object taking into account the loading conditions and positions of a component, and creating the object or a part thereof integrally including the hollow cavity structure by using additive manufacturing taking into account said information. It is an advantage of embodiments of the present invention that the manufacturing allows accurate positioning of the three dimensional hollow cavity structure in the object as well as introducing complex three dimensional hollow cavity structures. Optionally subtractive manufacturing can additionally also be applied simultaneously or sequentially. The present invention also relates to a method for manufacturing an object for which structural health monitoring is to be applied, the method comprising defining and obtaining position and geometrical information of a hollow cavity structure in the object, and creating the object or a part thereof integrally including the hollow cavity structure by additive manufacturing taking into account said position information.

It is an advantage of embodiments according to the present invention that the method can be applied without or with only limited impact on the fatigue or wear initiation behavior and fatigue or wear growth behavior.

The present invention also relates to a method for performing structural health monitoring of an object under study, the method comprising applying a pressure, different from the ambient pressure, on a hollow network structure comprising one or more cavities obtained using additive manufacturing forming integrally part of the object under study and being sealed from its environment, and measuring a pressure induced signal to detect pressure changes in the hollow cavity structure for deriving from said pressure changes whether or not wear or cracks have occurred in the object under study.

The method may comprise receiving data of acoustic emission signals from the hollow cavity structure or structure itself and deriving from said data whether or not wear or cracks have occurred in the object under study. The method may comprise evaluating data representative for high frequency signals of the acoustic emission signals for deriving whether or not wear or cracks have occurred in the object under study.

The method may comprise receiving data of acoustic emission signals from the hollow cavity a structure or the structure itself and deriving from said data of acoustic emission signals a location of a crack in the object under study.

The method may comprise receiving ultrasonic wave data of ultrasonic waves passing over the surfaces of the hollow cavity structure and deriving from said ultrasonic wave data whether or not wear or cracks have occurred in the object under study.

The method furthermore may comprise opening or closing at least one valve for creating an isolated region in the hollow cavity structure and for identifying whether or not a crack is present in the object near the isolated region.

The present invention also relates to a processing unit for use with a structural health monitoring system, the processing unit being adapted for receiving measurement signals representative of a physical parameter of the fully integrated three dimensional hollow cavity structure and for processing said measurement signals for detecting whether or not wear or cracks have occurred in the object under study.

The measurement signals may be pressure induced signals and the processing unit may be furthermore adapted for processing said pressure induced signals such as to detect pressure changes in the hollow cavity structure and for deriving from said pressure changes whether or not wear or cracks have occurred in the object under study.

The processing unit may be adapted for receiving data of acoustic emission signals from the hollow cavity structure and for deriving from said data whether or not wear or cracks have occurred in the object under study. The processing unit may be adapted for evaluating data representative for high frequency signals of the acoustic emission signals for deriving whether or not wear or cracks have occurred in the object under study. The data of acoustic emission signals may be used for localizing a crack in the object under study.

The processing unit may be adapted for receiving ultrasonic wave data of ultrasonic waves passing over the surfaces of the hollow cavity structure and for deriving from said ultrasonic wave data whether or not wear or cracks have occurred in the object under study.

The present invention also relates to a computer program product for performing, when executed on a processor, a method as described above. The present invention also relates to a data carrier comprising a computer program product as described above and the transmission of a computer program product as described above over a local or wide area network.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
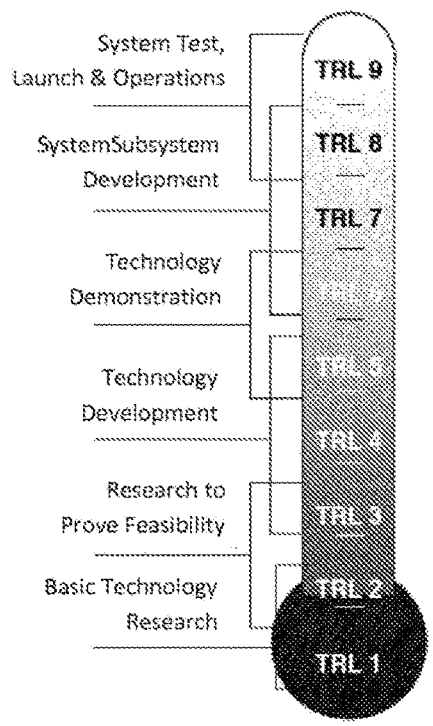
FIG. 1 shows the different levels of technological readiness as known in the art and used by large industrial players.
Figure 2:
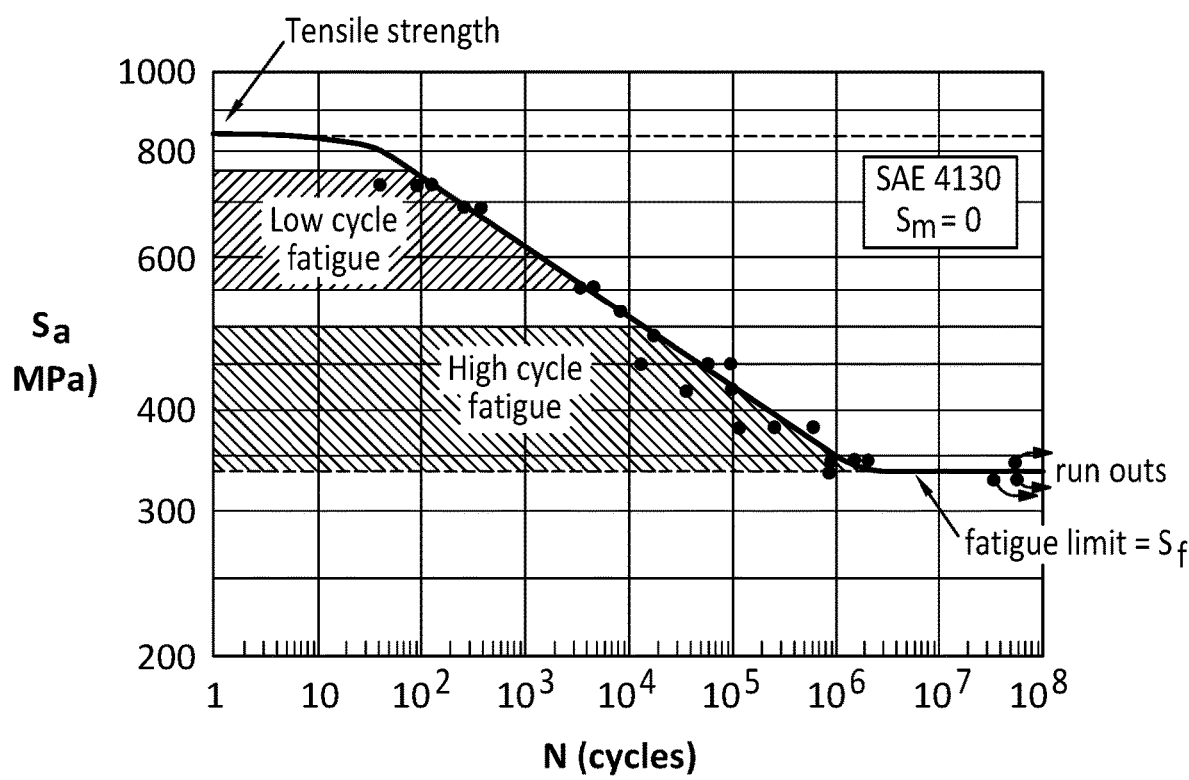
FIG. 2 shows the S-N curve of unnotched objects under study of a low alloy steel, wherein N is the fatigue life expressed in number of cycles and plotted on a logarithmic scale. S is the stress amplitude in MPa, providing a way of indicating fatigue properties as known in the art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "the object under study", reference is made to the structure that is checked and/or monitored for structural integrity e.g. fatigue integrity/wear/corrosion integrity through an embodiment of the current invention. The monitoring thereby allows early detection as well as follow up of damage in the structure. The structural integrity criteria to be monitored typically will depend on the application. The phenomena to be monitored could be e.g. fatigue cracking, tribological wear phenomena, corrosion, etc. Not all tribological wear and corrosion phenomena will be able to be monitored when only the pressure inside the cavities is monitored mainly those with a penetrating character towards the inside of the material e.g. abrasive wear, erosive wear, fretting fatigue, uniform corrosion, etc. Such structures may be structures in all sectors, including industrial sectors, where the performance and behavior of the components are key criteria for safety or for the direct operational cost. The objects may be metallic structural components although embodiments of the present invention are not limited thereto and also other type of materials can benefit from embodiments of the present invention, the type of material of the object under study therefore being non-limiting for the present invention. Structural health monitoring system according to embodiments of the present invention can for example be used to monitor the structural integrity of different kind structural materials, such as for example polymers, metals, ceramics or combination thereof.

Where in embodiments of the present invention reference is made to "a hollow cavity structure", reference can be made to one or more cavities, e.g. channels or capillaries, of which a cavity length extends in one direction, in some embodiments in at least in two distinct directions and in some embodiments in three distinct directions, i.e. outside an original plane. The cavities may be curved, may have corners, may have internal structures or one or more internal truss structure therein, may be separate and/or interconnected cavities. One or more truss structures may be enclosed by the cavity. The one or more cavities may form a network, such as for example a branched network. The hollow cavity structure is, according to embodiments of the present invention, an integral part of the object under study. Where it is stated that a structure is an integral part of the object under study, there is meant that the cavity structure is linked to or part of the object in such a manner that when the internal cavity structure is broken, the object is also damaged. It also feels environmental effects on the object in the same way as the object does. In other words, load and environmental interactions on the object will be transferred to the SHM system such that the load and environmental interactions are felt in the same way as in the object. The interconnection between the object and the cavity structure is not done by an adhesive but by the same material or an alloy of the structure or the object. The cavities may in one embodiment be channels.

This also means that the cavities are integrated within the component and don't have to be assembled with glue etc. This has the following advantages. A perfectly closed rigid system can be manufactured in this manner, with only a failure of the SHM system itself with respect to leaks on the location where the pressure sensor is installed if the installation of the sensor is done under another pressure condition than the working condition of the component itself. Due to the fact that the system is perfectly closed the absolute pressure on the inside can be monitored and has no problems with varying external pressure conditions and no external devices such as a vacuum tank or vacuum pump are required during the monitoring process only the temperature is required to interpret the internal pressure variations and eventual pressure variations due volume changes of the cavities linked to the loading of the component. Another advantage is that also a fluid can be used that prevents the oxidation, corrosion of the internal surfaces this also delays the crack initiation to higher load levels of the cavity itself. This means that the cavity can be placed closer to the typical crack initiation location and sooner indicating the presence of damage. The shorter crack length has a positive impact for a lot of application due to the fact that longer maintenance intervals can be used or lighter structure can be manufactured. The fact that the number of leakage locations is low has a positive impact on the robustness level of the system due to the fact that the number of false alarms/detections is low and this returns in a higher availability of the components.

Another advantage of the integration of the cavity on the inside of the component and forming an integral part is the fact that the location can be optimized with respect having no impact on the initiation of the damage phenomena but remain certainly on the path where the damage phenomena will pass when the damage grows. The fact the cavity structure is integrated within the component means that if the structure to monitor is made of a metal the connection between the cavity structure and the component will be a metallurgical connection, if the component is made of polymer there will be a polymeric connection, if the component is made of a ceramic there will be a ceramic connection and if the component consist of a combination of material types the connection will be also a combination.

Where in embodiments of the present invention reference is made to additive manufacturing techniques, reference is made to the process of creating or joining or combining materials or parts to make three dimensional objects, e.g. from model data. Such techniques may be performed layer by layer. The technique also sometimes may be referred to or may comprise rapid prototyping, rapid manufacturing, additive fabrication, layer manufacturing, freedom manufacturing, three dimensional printing, laser engineered net shaping, direct metal deposition, laser direct casting, laser consolidation, laser powder fusion, laser metal forming, directed light fabrication, laser powder deposition, automated laser powder deposition, shape deposition manufacturing, electron beam melting, laser rapid forming or laser additive manufacturing. It is a group of technologies used for manufacturing of (near)-net shape products (functional parts, prototypes, tooling components, etc.) starting from 3D computer-aided design (CAD) data or other geometry representations. Additive manufacturing can thus be based on a 3D model of an object, e.g. a CAD model. Depending on the particular additive manufacturing technique used, the object can be made in a range of different materials or alloys. Nowadays numerous types of metal alloys, polymers and ceramics can be processed with these new technologies.

Figure 3:
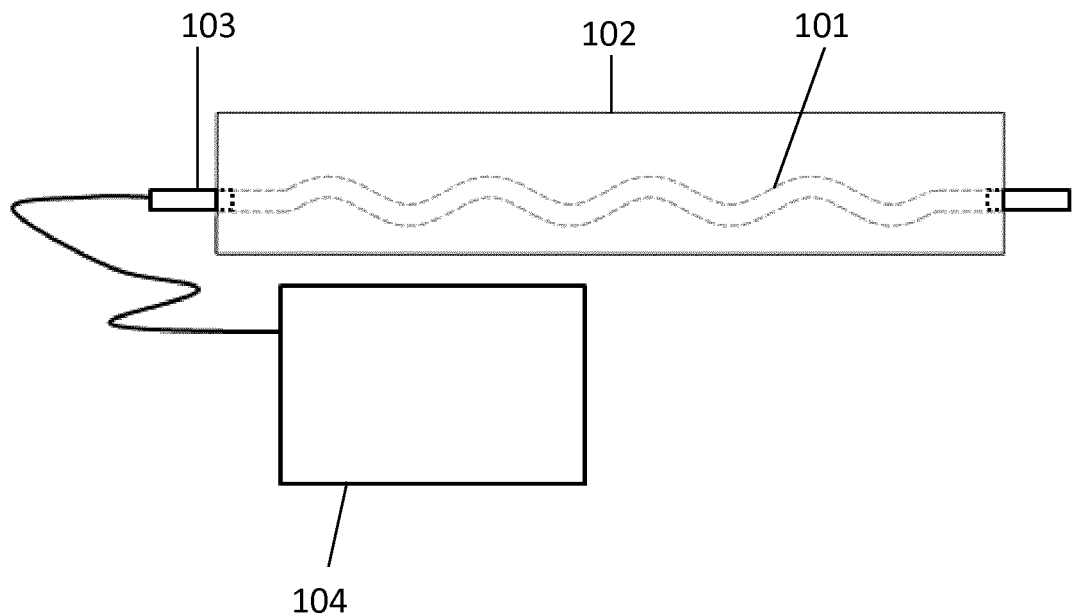
FIG. 3 illustrates a system for structural health monitoring according to an embodiment of the present invention.

Additive manufacturing is currently being explored and applied in numerous sectors such as aeronautical, space, automotive, energy, mechanical engineering and medical. Additive manufacturing is highlighted as the production technology of the future, enabling mass customization instead of mass production. The additive processes were originally developed for the production of prototypes. However they show high potential for the production of functional, low volume, highly complex parts with high added value. Besides near-net shaped products these technologies can also be used for prototyping, feature addition, repairs and coatings. The Standard Terminology for Additive Manufacturing Technologies has been defined by the ASTM F42 and ISO TC 261 committee in the ASTM 2792-12a standard to clarify the plenitude of terms used by different organisations. This standard also provides a categorization of the different types of AM technologies currently in use. In a first aspect, the present invention relates to a system for performing structural health monitoring of an object under study. The object may thereby be for example in an operation state or in a standby state, thus allowing e.g. to perform structural health monitoring during operation or without de-mounting. The system comprises a hollow cavity structure comprising one or more cavities obtained using additive manufacturing, the cavity structure being sealable from its environment and forming an integral part of the object under study, the cavity structure being furthermore connectable to a pressure sensor for sensing a pressure in the cavity structure. An example of such a structure 101 is illustrated in FIG. 3 whereby the structure 101 is an integral part of the object under study 102. The system also comprises or is connectable to a pressure monitoring sensor 103.

By way of illustration embodiments of the present invention not being limited thereto, different features and advantages of embodiments of the present invention will now be further discussed with reference to FIG. 3 and the further drawings.

According to embodiments of the present invention, the system may be such that at least one cavity of the hollow cavity structure can be described as a volume being defined by sweeping an area defined by a closed two dimensional curve, along at least one path, so that the path passes perpendicularly through the plane in which the closed two dimensional curve is defined. The path may be propagating in a one dimensional space, an at least two dimensional space or an at least three dimensional space. In some embodiments, the cavities may be channels. In certain embodiments of the current invention the hollow network structure 101 has a network of capillaries similar to the nervous system of living being.

The practical implementation of such a hollow network structure 101 comprising cavities, e.g. internal curved or cornered cavities such as channels or capillaries, in an object under study is challenging both from production point of view as well as from structural integrity of the object under study point of view. Embodiments of the present invention advantageously can make use of additive manufacturing. A number of examples of additive manufacturing techniques have been mentioned above. The additive manufacturing techniques may be laser-based additive manufacturing techniques, embodiments not being limited thereto.

As indicated in FIG. 3, the system comprises or is connectable to a pressure monitoring sensor which may be an off the shelve available pressure sensor or a dedicated sensor. In one embodiment, the sensor may be an integrated sensor, although the invention is not limited thereto. The pressure sensor may be based on any suitable pressure sensing technique and may be an absolute or a relative pressure sensor. If a pressure sensor is mounted on a cavity it can be connected to a measurement system that reads out the pressure value or locally stored values. This system 104 can be positioned on a specific location of the application or structure or it can remain detached from the structure or application. The connection between the measurement systems can be done by a wire or wireless. In a wireless configuration/wired configuration the different pressure sensors installed on a structure or on a machine with different structures could be monitored simultaneously what would decrease the inspection time significantly. Besides the measurement system also a direct visual indication of the pressure sensor itself could indicate that pressure sensor has tripped at a certain value. In addition the end user could also opt not to install a pressure sensor directly on the structure itself but only a valve that can be connected to a measuring sensor and device during an inspection and quickly check if the structural integrity has decreased. All the above mentioned selections will depend largely on the end user requirements, his design methodology and the application.

The system may also comprise a processing unit 104 for monitoring the pressure in the hollow network structure. More particularly, advantageously the pressure sensing data is processed for monitoring a stability of the pressure.

In a second aspect, the present invention relates to the definition methodology of the SHM and the manufacturing method for an object for which structural health monitoring is to be applied. The method comprises defining and obtaining positional and geometrical information of a hollow cavity structure in the object. Defining and obtaining information typically can include determining a position, dimension, shape and/or orientation of the hollow cavity structure taking into account the loading conditions, boundary conditions and position of a component that is subject to stress. The information can be obtained and defined such that the structure has little or no impact on fatigue or wear initiation and fatigue or corrosion or wear growth behavior. In one aspect, the present invention also relates to the design of an object for which structural health monitoring is to be applied, comprising the defining and positioning step but not the actual manufacturing step. Such a method may be computer implemented, as will be described later.

The manufacturing method further comprises creating the object or a part thereof integrally including the hollow cavity structure using additive manufacturing, taking into account said positional and geometrical information. In some embodiments, an additional subtractive manufacturing step is also applied (see examples further on).

Using additive manufacturing allows accurate positioning of the internal structure. The additive manufacturing techniques may be any type of additive manufacturing techniques as described elsewhere in the present application. The additive manufacturing may for example be an additive manufacturing technique, also referred to as 3D printing, as schematically illustrated in FIG. 5 to FIG. 9 which will discussed later.

The preferred structure of the structural health monitoring system for a certain application/structure will also be defined by the requirements of the end-user, the requirements imposed by the applied structural design methodology of the structure and the economic impact of each requirement. Some of these requirements that may be taken into account—although embodiments of the present invention are not limited thereby and thereto—are: (the following list is by no means exhaustive):

The need for monitoring a structural monitoring area in a global manner, a local manner or a combination of the two.
  The need for being able to perform additional visual inspections, which may provide complementary information as well as information that can be used for cross-checking.

- The need for being able to perform a fixed maintenance schedule or to perform a condition based maintenance schedule or a combination thereof.
- The need for online and/or offline inspection. Online inspection provides the advantage that monitoring can be performed in operating conditions for the system.
- The need for allowing detecting and/or monitoring of initial structural degradation, e.g. crack initiation. The structure of the cavity/capillary position, dimension or shape used for the structural health monitoring may be selected depending on the minimal level that needs to be detected.
- The need for monitoring the evolution of structural degradation, e.g. to monitor the wear rate or crack growth rate. Embodiments thereby may be adapted for monitoring critical structural degradation, which typically occurs before structural failure appears.
- The need for monitoring the evolution of the structural degradation, e.g. for evaluating the wear rate or crack growth rate. In particular embodiments, the critical structural degradation can be monitored, which occurs before structural failure appears.

Initial structural degradation and critical structural degradation are related to important parameters in damage tolerance methodologies. The first term is "detectable crack length" this is the minimal crack length that certainly (or with a certain probability of detection) will be detected by an inspection during production or maintenance. These values depend on the used inspection method and structure. These values are often different during production compared to maintenance. The second term is "critical crack length", this is the crack length that the structure is still able to withstand statically the highest load level that the structure is expected to be subjected to in its lifetime without failure. In production the parts are typically inspected in a final production stage, the inspection method applied during production will define the detectable crack length. This detectable crack length will be used during the design of the structure to define the threshold for the first inspection of the structure. This threshold is defined as the number of cycles between the minimal detectable crack length during production and critical crack length. This value is determined with crack growth simulations and validated by experimental testing. Due to the fact that often the inspection methods used during maintenance have a higher minimal detectable crack length, a second inspection will need to be done sooner than the number of cycles for the threshold to verify that no crack has appeared. This number of cycles is typically called the interval. This number of cycles is again determined with crack growth simulations and validated by experimental testing and lower than the threshold value due to the fact the initial crack was larger. To summarize the first inspection is done at the threshold and the subsequent inspections are done at each interval from the moment the threshold has been passed. If a crack would appear in a structure and is still smaller than the critical crack length the structure can be continued to be used but another inspection program probably needs to be defined. If a crack would appear that is higher than the critical crack length the structure has to be replaced immediately, this can of course cause serious downtime cost of the structure or application of which the structure is a part of.

In some embodiments according to the present invention, the system may be adapted for localizing the structural degradation. In some embodiments, the system may be adapted for detecting multiple failures and take this into account. It is an advantage of the current system that it can be clearly linked with the minimal detectable crack length and critical crack length conditions.

Depending on the selected application(s), the selected structure thus and embodiment of the current invention may be tuned.

A first cavity in the network can be introduced to mimic the detectable crack length of the damage tolerance methodology described above. A system comprising such a cavity will allow the user to confirm that no crack has appeared in its structure with a certain minimal crack length in the required zones. If a crack has been indicated by this type of system, the user will have the opportunity to schedule a specific maintenance plan for this structure. A second cavity in the network could be integrated in accordance with the critical crack length. This capillary/cavity will allow the user to confirm that no crack has appeared in its structure with a critical crack length in the required zones. This will inform the user that the structure has to be taken out of operation immediately to prevent a failure of the structure. A third capillary/cavity or network could be integrated in between the first and the second one to monitor the crack growth speed towards the operator.

By way of illustration, embodiments of the present invention not being limited thereto, some examples of structures and production methodologies are described below.

Figure 4:
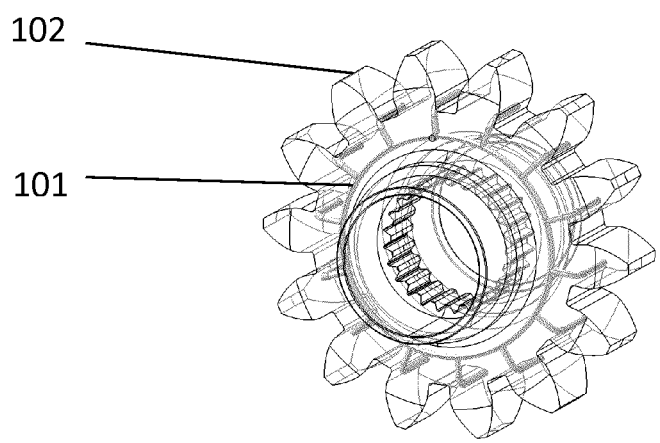
FIG. 4 shows a schematic overview of an exemplary implementation of the hollow network structure implemented in a gear, illustrating an embodiment of the present invention.

In a first example, a hollow network structure 101 present in a gear is shown in FIG. 4. The hollow network structure is in the present example composed of capillaries interconnected with each other.

Figure 5:
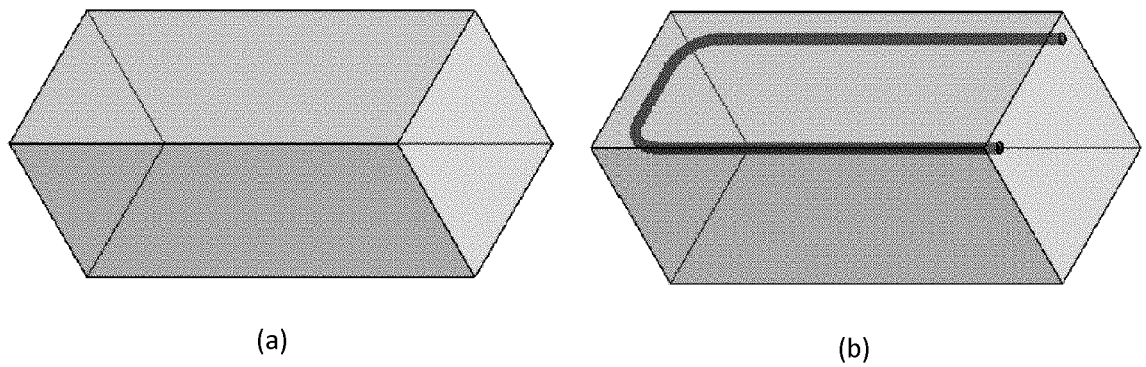
FIG. 5 to FIG. 9 illustrates different configurations and methods for manufacturing a system for structural health monitoring according to embodiments of the present invention.

In a second example shown in FIG. 5, to demonstrate the feasibility of realizing a three dimensional hollow network structure 101 using laser-based additive manufacturing, a cylindrical capillary was chosen. Other cavity types are possible and the results of the example with the cylindrical cavity can be used as a good initial reference. The advantage of using additive manufacturing is the minimal amount of restrictions towards the form of three dimensional hollow network structure from production point of view, however for this example sections of the cylindrical capillaries were chosen straight as they can also be produced with standard machining methods which allows a comparison from production perspective and from the influence of the specific production process on the structural integrity behavior. These straight sections are interconnected to each other with corner pieces and extend in different length directions, thus the corner pieces have to be formed with additive manufacturing to form an integral part. An example of such a structure is shown in FIG. 5(b).

Using layer wise layer cladding it was possible, in the experiment performed, to realize an object with a minimum achievable cylindrical diameter of 1 mm and a maximum inclination angle of 50°.

The limitations are the limitations of the used machine and are not limitations of the techniques applicable for embodiments of the present invention. Cubes of circa 20×20×20 mm were created with an integrated capillary for different constant diameter and inclination angles.

Further by way of illustration, a number of methods are described allowing production of the network of cavities in the structural health monitoring system.

The cavity can be integrated on the inside of the structure during the build-up of the entire structure by additive manufacturing process. In this condition the part would be completely manufactured with additive manufacturing techniques and gives the minimal amount of restriction towards the designer of the product.

An example of an object created that can be manufactured completely with additive manufacturing is shown in FIG. 5, with such a manufacturing technique is shown in FIG. 5, whereby at the left hand side the original manufactured part manufactured with conventional methods without integrated cavity and at the right hand side (b) the additive manufactured part with integrated cavity.

Besides additive manufacturing also a hybrid process could be used to produce the cavities. A hybrid process is a combined process of additive manufacturing with a substractive process such as for example machining or punching, electron beam machining, laser drilling or laser ablation. After each layer or a number of layers that are deposited, a machining, punching, electron beam machining, laser drilling or laser ablation process can take place to create or finish the outer surfaces and the inner surfaces of that section. As final process step a cold expansion could also be applied with a small mandrel or shot peen operation, etc. to create a beneficial residual stress pattern in the vicinity of the capillary internal structure. The prescribed production steps can be applied partly or as whole to generate the cavity/capillary or network for the structural health monitoring system.

The capillary/cavity can also be added into the original dimensions of the structure/application that is completely produced with a conventional production process (e.g. machining) with an exception of the capillary/cavity, as shown in FIG. 6a. In a production stage, an extra slot is machined, as shown in FIG. 6b. Afterwards the slot is filled up again with an additive manufacturing process or a hybrid process with the integration of a cavity as indicated in FIG. 6c. The added material itself can be the same material of the structures itself or from a different alloy or type. With a hybrid process, there is meant that a part of the structure is made using conventional production methods, whereas another portion of the structure is made using additive manufacturing. For example, it is possible that a part of the straight capillaries/cavities are manufactured with conventional production methods such as electrical discharge machining, machining, etc. In FIG. 6c only the corners would then be produced with additive manufacturing techniques. It is an advantage that the cavities can be integrated within the original dimensions of the components certainly when the assembly of different components prevent the installation of cavities at the external surface of the components and also with respect to the damage initiation process.

Figure 7:
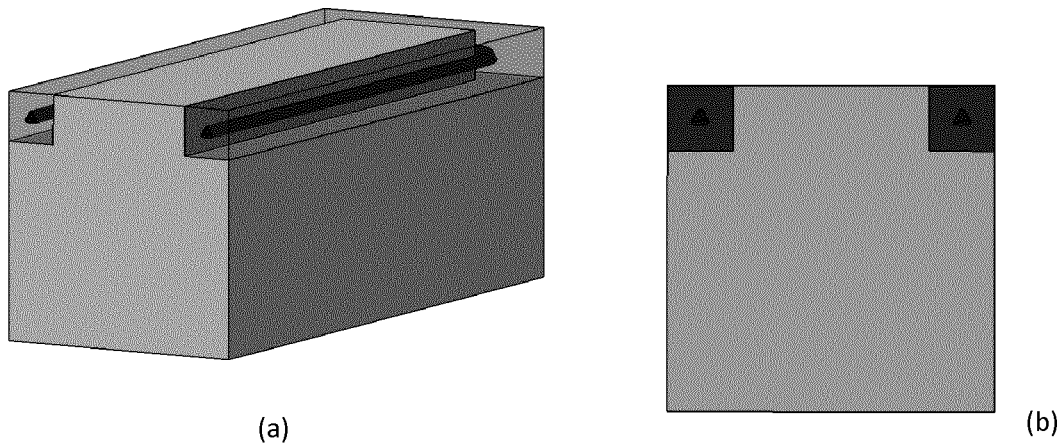
Figure 8:
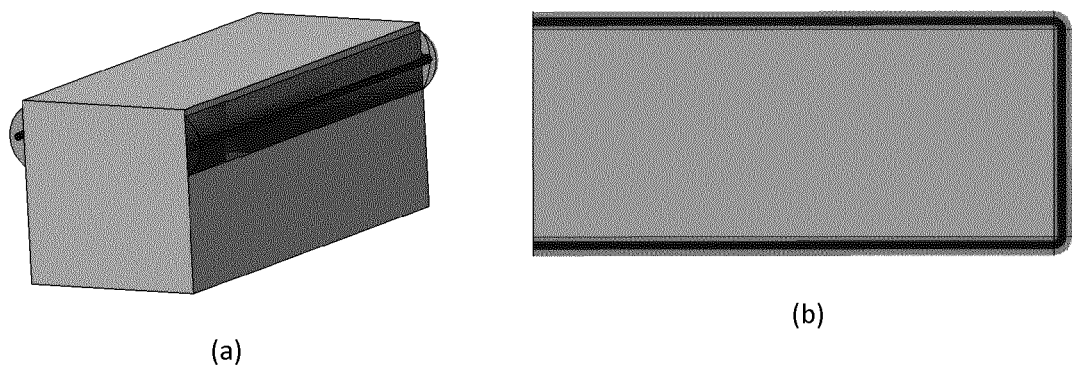

The cross-section of the cavity/capillary certainly doesn't have to be circular for additive manufacturing. It can have for example be a triangular section with curved corners as indicated in FIG. 7.

Another configuration would be to integrate a capillary/cavity towards the structure but not on the inside of the original part but to add this at the outside of the original dimensions of the structure/application. This kind of configuration is presented in FIG. 8 from two viewpoints. The biggest part is again manufactured with conventional production methods and other parts are added on the outer side of the base structure using additive manufacturing or a hybrid method. The added material itself can be the same material of the structures itself or from a different alloy or type.

Figure 6:
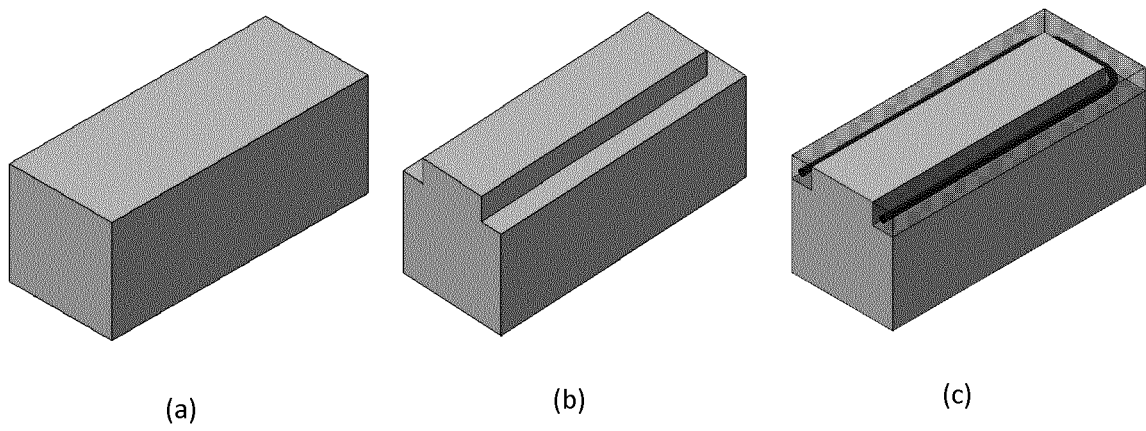
Figure 9:
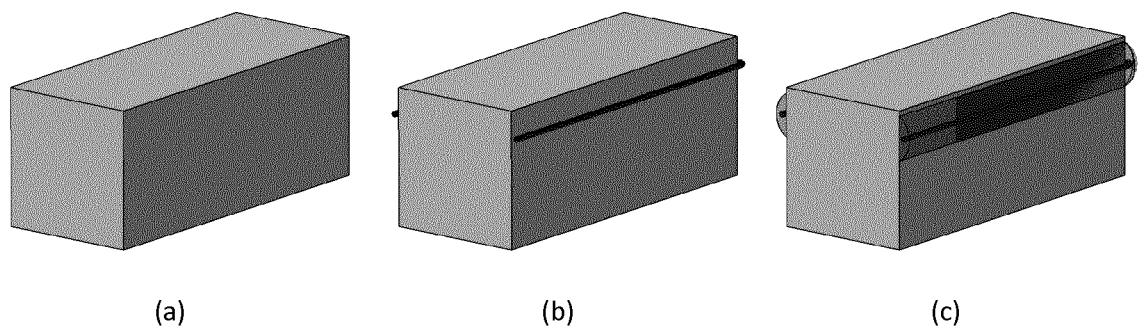

Another application method would be to join a structural part with a conventional manufactured, preformed capillary as shown in FIG. 9b. The join process would be performed by an additive manufacturing process that would combine the two structures with each other. The two structures and the joining material could be again of the same material type or not. This method is graphically represented in FIG. 9 for adding a capillary to the outer side of the original dimensions of the base structure. But this could also be done within the original dimensions of the structure as shown in FIG. 6.

An additional feature of an embodiment of the present invention could be added by the application of a type of liquid penetrant, colour dye or a gas could be integrated on the inside of the cavities/capillaries. The liquid penetrant, dye or gas could be applied on the inside of the capillaries/cavities or networks with a small or no overpressure if a crack would appear the fluidum would escape and could be detected by a visual inspection or a gas detector. The gas could have a strong odour and could function as safety for the human persons in the vicinity. The dye or gas could also be used in a gearbox for example if there is no place or possibilities to install a sensor on top the structure, this would allow the user to monitor different structures (e.g. gears) at the same time with one gas detector that is able to detect different types of gases or by the scheduled oil inspections. Another application could be for example an implant at the inside of a human body, a fluidum could be integrated permanently or from time to time in the capillary/cavity or network that would allow the specialist to detect easily with the current available medical imaging techniques if structural integrity has decreased below an acceptable limit.

The system furthermore may comprise further optional features and components as known by the skilled person.

In still a further aspect, the present invention relates to a method for performing structural health monitoring of an object under study. The method may be applicable to a group of applications, e.g. for characterizing fatigue, wear, crack formation, etc. The method comprises applying a pressure once during its lifetime (so pressure remains permanently in the cavity when no failure occurs) or at regular time intervals, different from the ambient pressure, on a hollow network structure forming integrally part of the object under study and being sealed from its environment, and measuring a pressure induced signal to detect pressure changes in the hollow cavity structure (101) for deriving from said pressure changes whether or not the structural integrity has been deteriorated e.g. cracks or wear have occurred in the object under study. A number of different characterization techniques may be used separately or in combination. In one example use is made of acoustic emission from the hollow structure or from the structure itself. In another example, use is made of a reply to an ultrasone wave. In yet another example, use is made of pressure sensing. By locally performing measurements, optionally using a plurality of valves for opening or closing at least one valve for creating an isolated region in the hollow structure, localization of fatigue, wear or crack formation or growth can also be performed.

By way of illustration, embodiments of the present invention not being limited thereto, a number of particular examples will now be discussed with reference to FIG. 10 to FIG. 12, highlighting different monitoring and/or localization procedures that can be performed.

Figure 10:
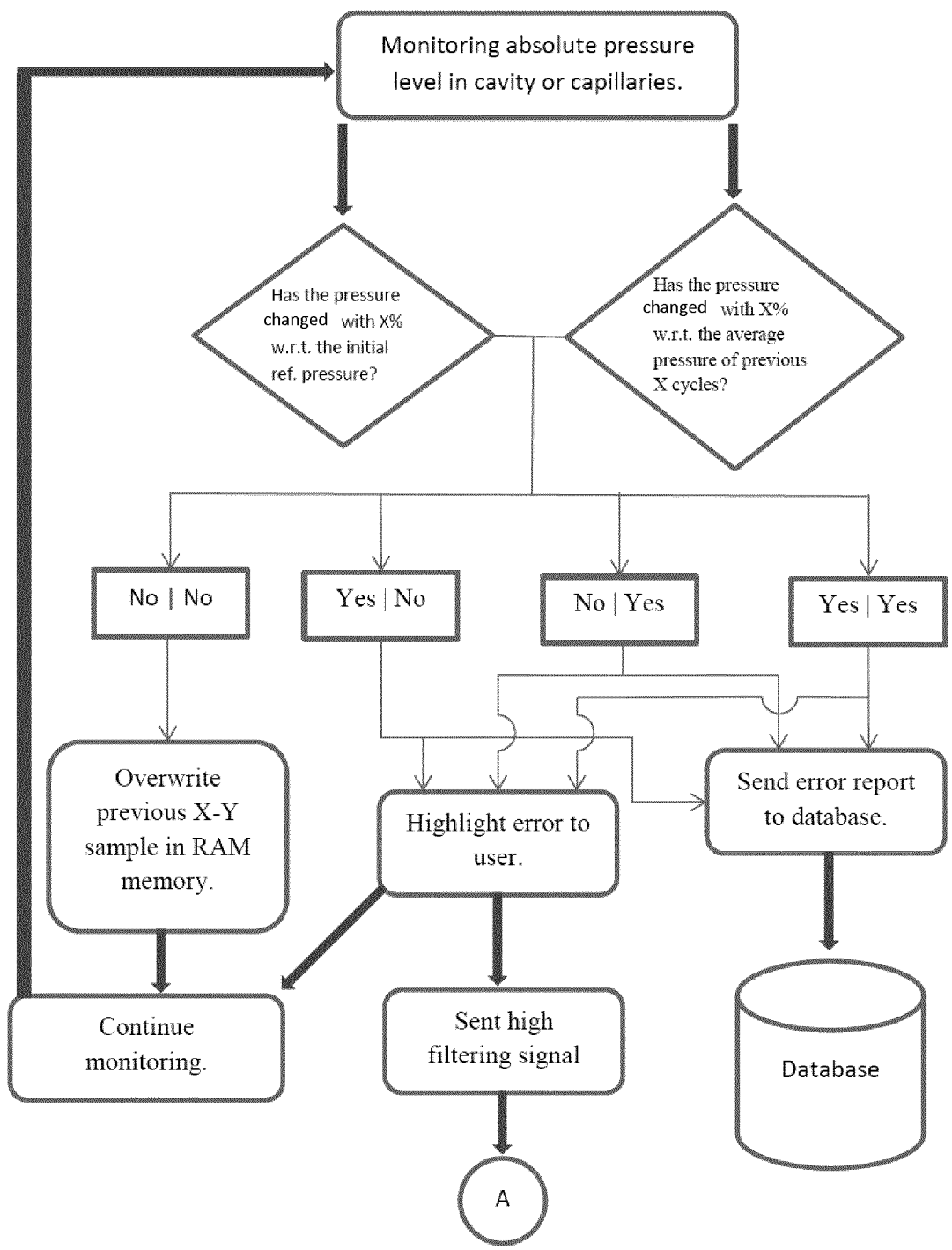
FIG. 10 shows a schematic representation of an exemplary detection procedure according to an embodiment of the present invention.
Figure 11:
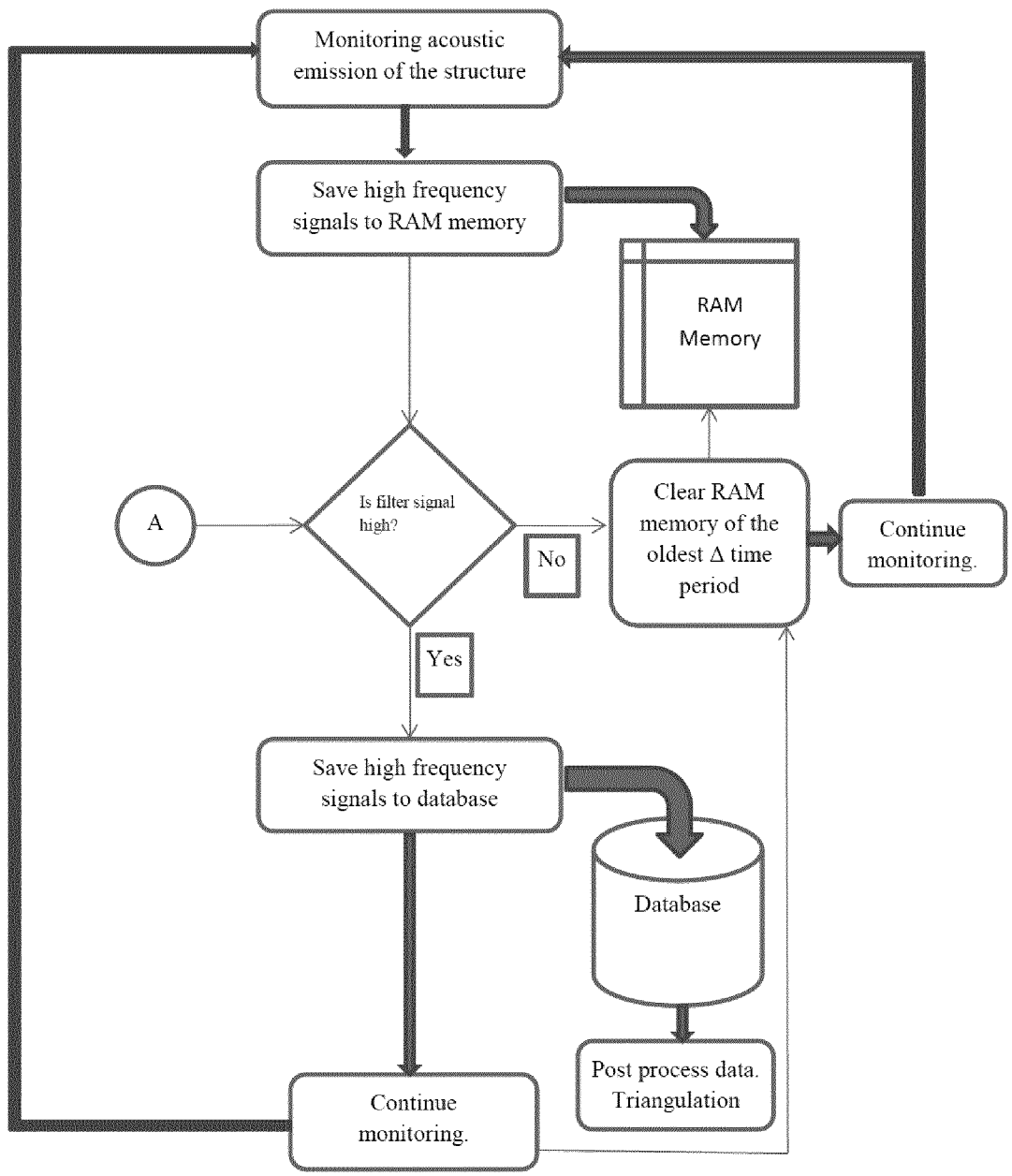
FIG. 11 illustrates a schematic representation of an exemplary localization procedure according to an embodiment of the present invention.

In a first exemplary method, a monitoring cycle is performed as shown in FIG. 10

In the beginning of each cycle a pressure level is measured, e.g. the absolute pressure level, in the hollow network structures 101. Such sensing typically may be performed using a pressure monitoring sensor 103 adapted for connecting to the three dimensional hollow network structure.

In a next step, the measured pressure is compared with the initial pressure value and/or with the previous pressure value or an average of a number of previous measurements. If the pressure has changed over more than a predetermined value or relative amount with respect to the initial or previous pressure values, i.e. in one or both comparisons, an error is highlighted to the user and a high filter signal can be passed to a localization procedure. The error report typically is also stored in a database. If no substantial drop has been measured, the memory is updated, e.g. previous pressure values may be replaced by the more recently measured values. The monitoring cycle may be repeated at predetermined time intervals, may be performed continuously or may be triggered by operational events during the lifetime of the object under study.

Besides a method for monitoring to detect a crack or wear in the object under study 102, in certain embodiments of the current invention a method for localization of wear or cracks is illustrated with reference to FIG. 11. Such a method typically may comprises in one embodiment making use of acoustic emission, the step of monitoring the acoustic emission of the object under study 102 and analyzing the result. The acoustic emission data is analysed whereby the high frequency signals can be stored in a memory, e.g. in a RAM memory. The data may replace older data, e.g. the oldest data, although the data also may be simply added to the memory.

If a high filter signal is received from the detection procedure, the high frequency signals detected from the acoustic emission data can be stored in a database and processed, e.g. by triangulation, for deriving localization information of a crack or wear or corrosion.

Typically, unless final failure has been established, monitoring the acoustic emission of the object under study is continued. It is an advantage of this setup that the acoustic emission data can be filtered with this physical filter which eliminates one of the fundamental problems of acoustic emission which is the large amount of data that needs to be post processed.

The localization procedure may be performed offline.

Figure 12:
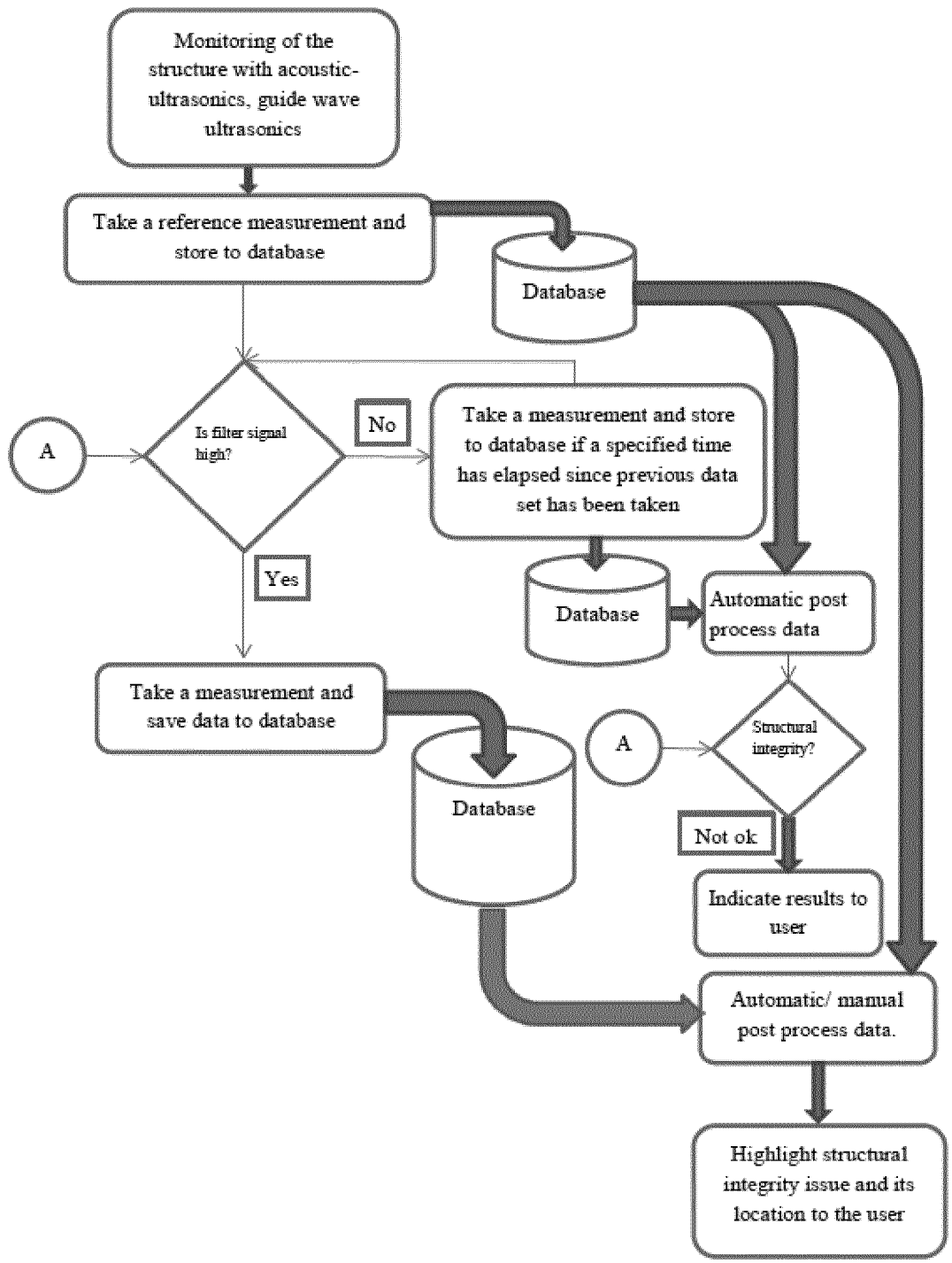
FIG. 12 illustrates a schematic representation of an exemplary localization procedure based on ultrasone-acoustics guided wave, according to an embodiment of the present invention.

An alternative example of a localization procedure is shown in FIG. 12, whereby use is made of acoustic-ultrasonics.

In a first step, the structure is monitored with acoustic-ultrasonics, e.g. using a guide wave of ultrasonics travelling of the internal structure/cavity. A reference measurement has previously been stored to a memory at the start of the usage life of the structure or database or may be recorded at the initiation of the process. Based on a detection procedure as e.g. described with reference to FIG. 10, when an indication of a detection, e.g. a high filter signal is detected, high frequency signals in the acoustic-ultrasonics data from a new measurement are stored and can be processed, e.g. later manually or directly automatically. When the filter signal is not activated a new measurement can be obtained after a predetermined time interval since the last previous measurement. The received acoustic ultrasonic data can furthermore be checked whether the structural integrity is ok, based on a predetermined algorithm, a set of rules, based on neural network processing, etc. If it is found that the structural integrity is not ok, the latter is indicated to the user. Such an indication can also be shown based on a comparison of acoustic-ultrasonics post processed result and the filter signal.

It is to be noticed that in general, methods according to embodiments of the present invention may make use of comparison of previously measured data with currently measured data and that, if the difference exceeds a predetermined value, action can be taken. The processing may be based on predetermined algorithms, predetermined rules, neural network processing, comparison based on look up tables, etc.

In yet another aspect, the present invention relates to a processing unit for use with a structural health monitoring system. Such a processing unit may be part of a system as described in the first aspect or may be separate thereof. It may be positioned on the object under study or may be connectable thereto, directly or indirectly. The processing unit is adapted, e.g. by comprising an input unit for receiving measurement signals representative of a physical parameter of the fully integrated hollow cavity structure and for processing said measurement signals for detecting whether or not wear or cracks have occurred in the object under study. The processing unit may be adapted for performing a method as described above. It may be e.g. adapted for processing pressure signals, acoustic emission signals or acoustic ultrasonic guided wave signals and for deriving thereof a change indicative of occurrence structural degradation (e.g. of fatigue, wear or cracks) in the object under study. The processing unit may be adapted for taking into account information for deriving a location of the fatigue, wear or cracks, e.g. data of an additional measurement technique, data of settings of valves in the system, etc.

In still another aspect, the above described system embodiments may correspond with an implementation of the method for designing an object for structural health monitoring or part of a method for structural health monitoring of an object under study, as a computer implemented invention in a processor. Such a system or processor—the processor also being discussed in functionality in an aspect described above—includes at least one programmable computing component coupled to a memory subsystem that includes at least one form of memory, e.g., RAM, ROM, and so forth. It is to be noted that the computing component or computing components may be a general purpose, or a special purpose computing component, and may be for inclusion in a device, e.g., a chip that has other components that perform other functions. Thus, one or more aspects of the present invention can be implemented in digital electronic circuitry, or in computer hardware, firmware, software, or in combinations of them. While a processor as such is prior art, a system or processor that includes the instructions to implement aspects of the methods is not prior art. The present invention thus also includes a computer program product which provides the functionality of any or part of the methods for designing or monitoring structural health according to the present invention when executed on a computing device. In another aspect, the present invention relates to a data carrier for carrying such a computer program product. Such a data carrier may comprise a computer program product tangibly embodied thereon and may carry machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

By way of illustration, embodiments of the present invention not limited thereby, a further example and experimental results obtained therewith are discussed.

Figure 13:
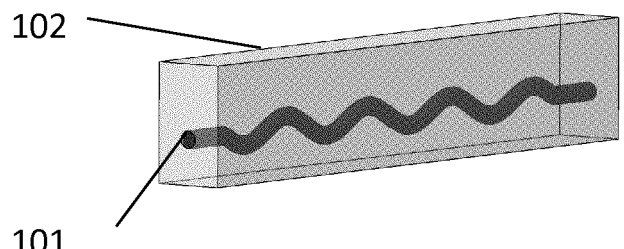
FIG. 13. shows a 3D schematic view of an object under study with an integrated capillary according to an embodiment of the present invention.
Figure 14:
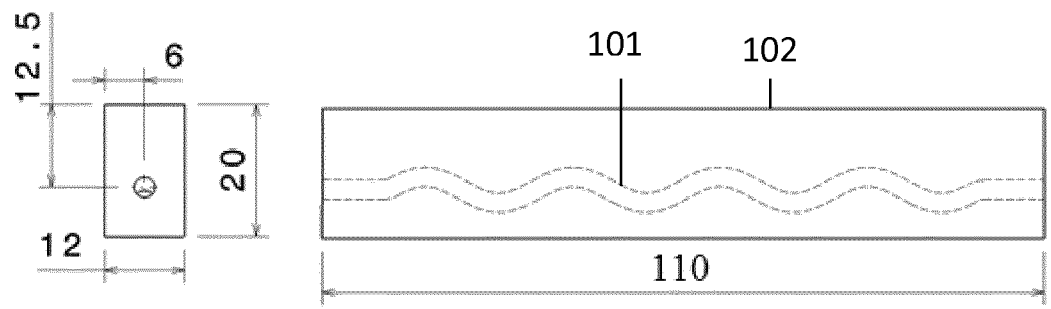
FIG. 14 shows the right and front view of the object under study schematically shown in FIG. 13.

In the particular example shown, a three dimensional hollow structure 101, more specifically a cylindrical capillary is realised that has no impact on the fatigue initiation behaviour of the object under study 102. In the example, a 3D feature having a sinusoidal shape of the capillary is formed. Such a structure is obtained by sweeping an area, defined by a closed two dimensional curve, along at least one path, so that the path passes perpendicularly through the plane in which the closed two dimensional curve is defined, the path in this case being sinusoidal. The integrated capillary has a diameter of 3 mm and the path has a sinusoidal shape with an amplitude of 2 mm and a period of 25.7 mm as shown in FIG. 13. The other geometrical details are indicated in FIG. 14. The object under study 102 in the present example is made of stainless steel 316L and is produced with layer-wise laser cladding. Two objects under study 102 were built in 'standing' direction with outer dimensions 12 mm×20 mm×110 mm. After the layer-wise laser cladding process the objects under study were machined to final dimensions on the external surfaces as specified in FIG. 14.

The determination of the location, internal shape, orientation and network of the first type of cavity/capillary or network defined above for the four point bending test samples was based on the following two design criteria: (i) the tensile stress on the highest loaded plane (outer surface) should not be increased (ii) the tensile stress on the tops of the sinusoidal shaped capillary should not be higher than the highest loaded plane.

The verification of these design criteria were done via a detailed static finite element simulation. This simulation with unit loads revealed that for a capillary with a diameter of 3 mm both criteria were just reached for a capillary depth of 13.5 mm, for this depth the tops of the sinus are 3 mm from the outer surface away. The conservative defined design criteria were followed and specimens with a depth of 12.5 mm were built for this depth the tops of the sinus are 4 mm from the outer surface away. The capillaries currently applied for feasibility tests varied between 0.5 mm and 5 mm in diameter size. When a hybrid process (additive manufacturing and subtractive manufacturing) would be applied this diameter size could be decreased down to tens of micrometers or even down to 3 μm.

The internal capillary is realized using laser based additive manufacturing whereby the capillary is designed such that:

The tensile stress on the highest load plane (outer surface) of the object under study 102 is not increased by the presence of the internal capillary.

The tensile stress on the tops of the sinusoidal shaped capillary is not higher than the highest loaded plane.

Figure 15:
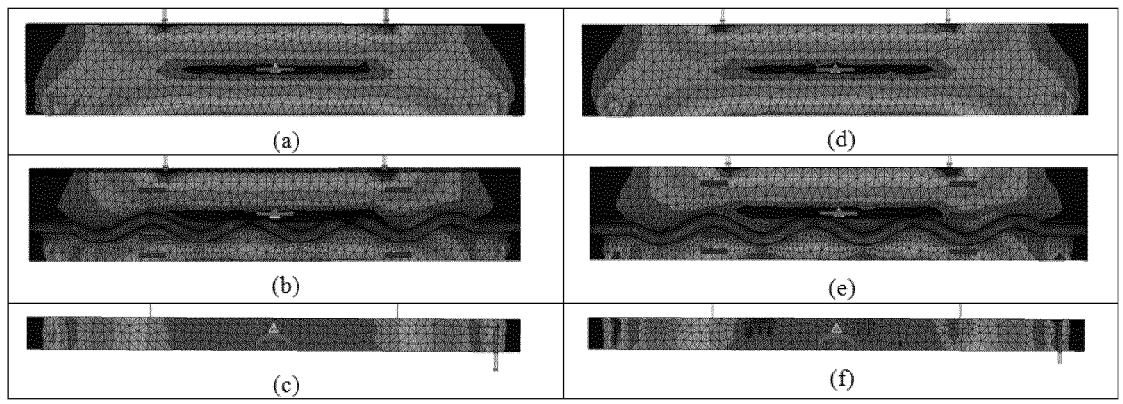
FIG. 15 shows the absolute principal stress for unit loading for an object according to FIG. 13 The left column shows the stress distribution in an object under study having a capillary at a depth of 12.5 mm, for the right column the depth is 13.5 mm. The top row shows the stress distribution in the front of the object under study. The middle row shows the stress distribution in the middle section of the object under study and test. The bottom row shows the stress distribution in the bottom of the object under study and test.

The internal capillary is located based on these design constraints and the design is verified using a detailed static finite element simulation. This simulation with unit loads reveals that for a capillary with a diameter of 3 mm both criteria are just reached for a capillary depth of 13.5 mm (see FIG. 15), for this depth the tops of the sinus are 3 mm from the outer surface away. The conservative defined design criteria were followed and objects under study 102 with a depth of 12.5 mm were built. For this depth the tops of the sinus are 4 mm from the outer surface away.

Figure 16:
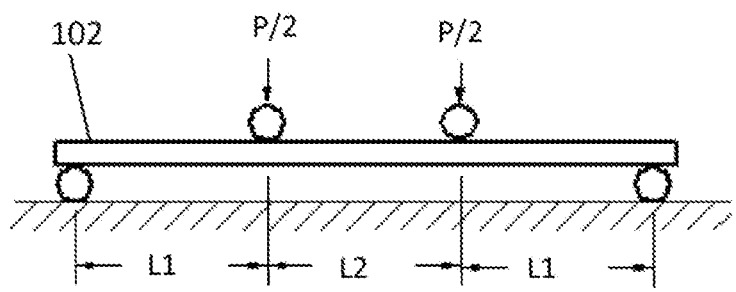
FIG. 16 shows schematically the setup for a four-point bending fatigue test setup.

In the experiments, the objects are provided with a pressure transducer 103 (Kulite XTL-123C-190M-1,7-BAR-A) at one side and with a check valve (Clippard MCV-1-M5) at the other side. After sealing, each object under study 102 was placed in a Vacuum chamber until the air in the capillary reached an absolute pressure of ≈0.55 bars. As a final step an extra stop (Clippard 11755-M5-PKG) was installed on the check valve as an extra occlusion. Thereafter the object under study is put in a servo hydraulic test bench. The loading principle on the object under study is schematically drawn in FIG. 16. A four point bending test is applied. This test setup produces a uniform moment without shear between the two inner loading rollers in the object under study which gives rise to a uniform maximum tensile stress in the surface of the object under study 102. In bending the stress varies through the depth of the beam in such a way as long as the loading remains below yielding.

Unnotched objects under study 102 are subjected to a cyclic fatigue loading with constant amplitude. Unnotched objects under study 102 are used as good test objects based on the fact that unnotched objects under study 102 have a higher fatigue initiation resistance than the identical object under study with a notch. This choice is conservative with respect to the test objective to indicate that the crack initiates at the outer surface of the object under study 102 and not at the inner surface of the integrated three dimensional hollow network structure 101.

For the sinusoidal capillary 101 integrated into the object under study 102, the moment of inertia varies for the different cross sections due to the fact that the circular cross section of the capillary has a different distance towards the neutral axis. The further the cross section is removed from the neutral axis the lower the moment of inertia becomes and the higher the nominal stress in the section.

The locations with the highest likelihood for crack initiation from the capillary are situated at those cross sections that are furthest away from the neutral axis if the crack would nucleate from the capillary. The principal reason for this higher probability is directly related to the higher stress values at these stress concentration locations. If the stress concentration around the capillary itself would have an impact on the fatigue initiation behavior on the outer surface of the object under study, then the likelihood of initiation should be higher at those cross sections that are again furthest away from the neutral axis. Due to the fact that the stress concentration of the capillary are closer to the outer surface and the stress values at the stress concentration locations are higher. Fatigue properties of unnotched objects under study are generally supposed to be material properties such as S-N curves. Fatigue life under cycling loading consists of two phases: crack initiation life and crack growth period. The second period is relatively short for unnotched objects under study at low loads if compared with the crack initiation period.

The test procedure applied was the step method. Step testing provides a method to determine the endurance stress (or fatigue strength) in an approximated manner for a particular stress ratio with a single object under study as well as a method of generating endurance limits for one-of-a-kind objects under study. The initial stress amplitude is chosen below the fatigue limit of the object under study. For each step a large number of cycles N with the same loading are applied. If failure didn't occur the stress amplitude is increased with a selected step and again N numbers of cycles are applied. This procedure is repeated until failure occurs. From this test procedure the endurance limit is defined as the highest stress value wherefore N numbers of cycles have been applied without crack initiation during the step test. If the initial fatigue stress level is chosen too high and the sample breaks before reaching the initial N number of cycles, the endurance limit can't be determined.

The fatigue tests were carried out on an MTS machine with a maximum static and dynamic load capability of 100 kN. During the tests the pressure transducer 103 was connected to the capillary, the actuator load and displacement were monitored continuously.

The applied sinusoidal cyclic load in each step had a constant amplitude with a R ratio equal to 0.1 and frequency of 5 Hz. For the initial step of the first object under study the cyclic peak stress was limited to 20% of yield stress ($\sigma_y$) and the number of cycles to 100.000. In subsequent steps the peak stress was increased by 5% of $\sigma_y$ until the fatigue load reached the value of 40% of $\sigma_y$, where beyond this level the peak stress increased by 10% of $\sigma_y$ for each step with exception of the last two steps until the crack was detected. For the initial step of the second object under study the cyclic peak stress was limited to 35% of $\sigma_y$ and the number of cycles to 100.000. In the second object under study, the first loading step of the fatigue load was 35% of $\sigma_y$ and its duration was 100.000 cycles. In every next loading step the amplitude was increased by 5% of $\sigma_y$ until the fatigue load reaches the value of 40% of $\sigma_y$ beyond this level the fatigue load increased by 10% of $\sigma_y$ until the crack was detected. Concurrently, liquid penetrant inspections were performed on the objects under study as a reference. Both of the objects under study 102 were inspected under the ultraviolet light for the detection of possible crack initiations. The products that have been used were ZYGLO® Fluorescent Penetrant Kit.

Nine steps were tested for the first object under study 102. This gave a total of 1.309.009 loading cycles before the crack reached the capillary and the test was automatically stopped. For each step 100.000 cycles were tested with exception of step 8 and 9 where respectively 500.000 and 109009 cycles were applied. The peak stress started from the 9.9% of $\sigma_{uts}$ (56 MPa ultimate tensile strength) and reached 68.9% of $\sigma_{uts}$ (390.6 MPa) in step 9.

Sixteen steps were tested for the second object under study 102. This gave a total of 1.888.291 loading cycles before the crack reached the capillary and the test was automatically stopped. For each step 100.000 cycles were tested with exception of step 16 where 388.291 cycles were applied. The peak stress started from the 17.2% of $\sigma_{uts}$ (97.65 MPa) and reached 83.7% of $\sigma_{uts}$ (474.3 MPa) in step 15 and 16.

In step 9 after 100.000 cycles for the first object under study, a crack was detected on the surface of the object under study 102 with the liquid penetrant inspection. After applying 9009 extra cycles in step 9 the crack reached the capillary and the effective structural health monitoring (eSHM) system detected the crack and stopped the test. This clearly indicates that the crack grows from the outer surface towards the capillary and not vice versa. In the second object under study the crack wasn't detected prematurely with a liquid penetrant inspection due to the fact that no intermediate liquid penetrant inspections were performed after each 100.000 cycles in step 16. Nonetheless the eSHM system detected successfully the crack and the test was stopped.

The pressure values for sensing that typically were applied during testing varied between 0.25 bar and 0.75 bar absolute pressure, these values can of course be lower. Currently air was used but this may equally be an inert atmosphere in the capillary or cavity (this will improve the crack initiation resistance of the internal structure). This can e.g. be done by flushing the capillary for example with argon and afterwards applying an under pressure. Embodiments of the present invention can advantageously make use thereof.

Figure 17:
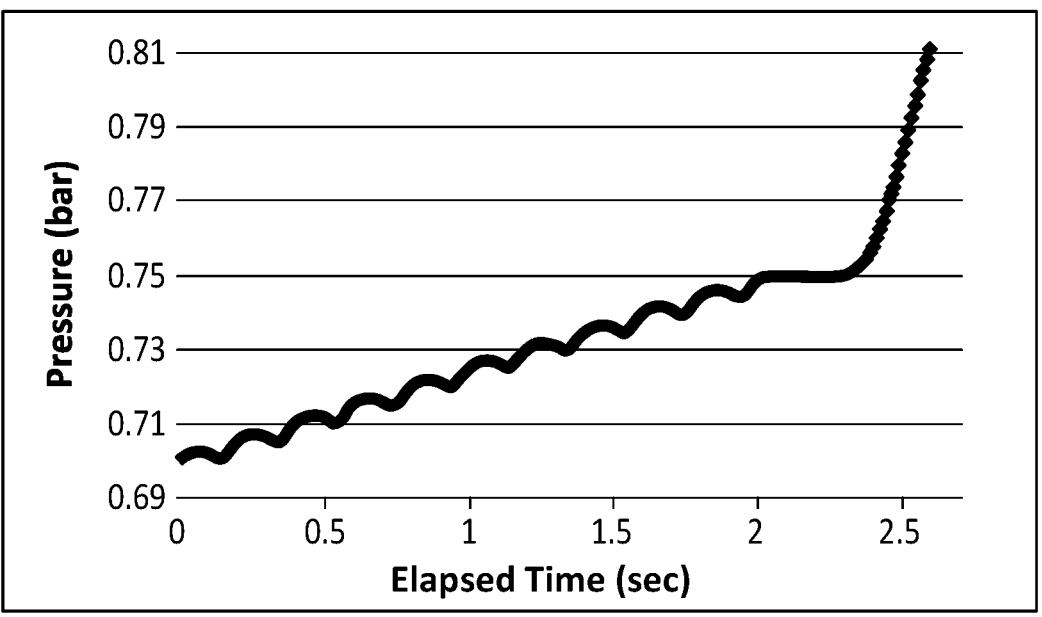
FIG. 17 and FIG. 18 shows the pressure in the capillary in function of time for the test performed on the first respectively second object under study, illustrating features of an embodiment of the present invention. The pressure at the end of the performed test is indicated in bar and increases due to the fact that an under pressure was applied and when a crack reaches the cavity it provokes a gradual pressure increase in relation to the loading conditions.
Figure 18:
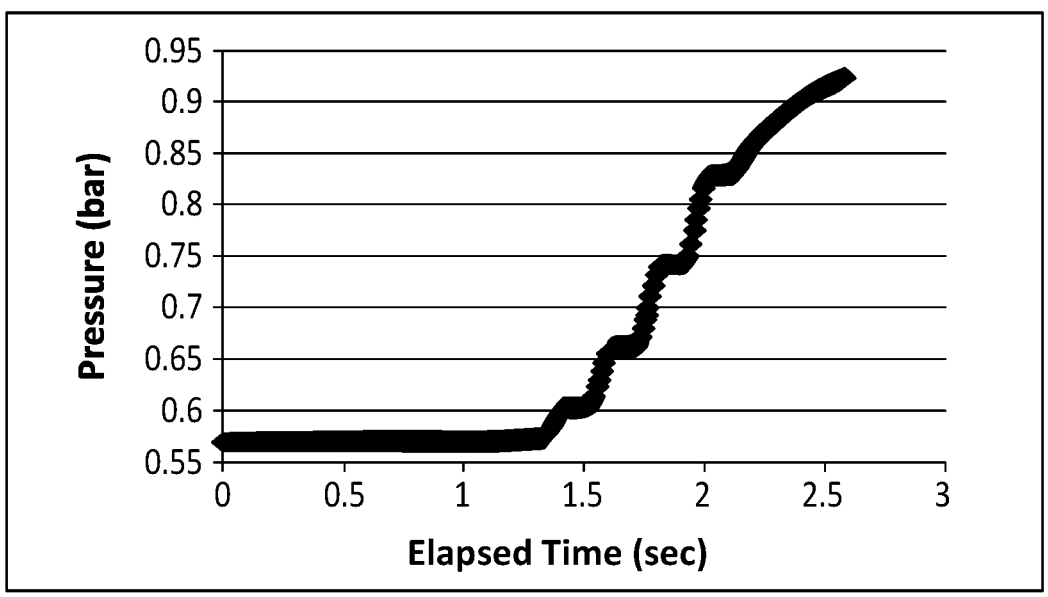

The absolute pressure increases stepwise when the crack infiltrates the capillary. The gradual character of the pressure increase is linked with the cyclic loading and the fact that the crack opens and closes during each load cycle. This phenomenon could be clearly observed by plotting the pressure values versus elapsed time for the last applied load cycles (see FIG. 17 and FIG. 18). The difference between the two graphs is related to three principal causes:

The different peak stress which was applied in the last step of each object under study The pre-set limit for the pressure transducer that activate the stopping procedure of the controller of the test machine The stopping procedure was different for each object under study. For the first object under study the pre-set limit was 0.75 bar. On the moment that the pressure exceeded this value the actuator was switched off automatically. This procedure started for the first object under study at 2s as depicted in FIG. 17. The stopping procedure caused an overload and this caused the pressure to rise to an absolute value of 0.81 bar. For the second object under study the pre-set limit was 0.83 bar. On the moment that the pressure exceeded this value the actuator was stopped. This procedure started for the second object under study at 2,14s as depicted in FIG. 18. Due to the higher loading the object under study was plastically deformed and caused the capillary to be in contact with the atmosphere.

After fatigue testing the two objects under study were examined with X-ray tomography. X-ray tomography is a non-destructive technique which enables the visualization the internal structure of complex objects. In this manner the exact location could be defined where the crack infiltrated the capillary. It was found that the crack developed through the region of the maximum peak of the sinus. This zone has the lowest likelihood of crack initiation and lowest possible influence of the crack initiation behaviour for cracks starting from the outer surface as explained earlier. This means that the capillary has no crucial influence on the fatigue initiation location and behaviour for these objects under study and for these test conditions.

Afterwards also a fracture analysis was performed with a metallographic microscope and a scanning electron microscope. This analysis also confirmed that the cracks initiation location was situated on the outer surface, more particular at a corner. This could be clearly observed by the faceted surface of the crack initiation location.

The performed test illustrates:
that it is feasible to integrate a three dimensional hollow network structure 101 according to the present invention in an object under study 102
that the three dimensional hollow network structure 101 under a pressure different than the environment pressure and being monitored through a pressure sensor 103 according to the present invention allows to detect the presence of a crack that the crack initiates at the outer surface of the object under study 102 to the inner surface of the three dimensional hollow network structure 101 and not vice versa that the three dimensional hollow network structure 101 was positioned such, by following the design constraints, that the presence of the three dimensional hollow network structure 101 had no influence on the crack initiation behavior.

The above example shows that the internal three dimensional hollow structure can be designed such that it has no influence on the crack initiation location, it has no influence on the crack initiation behaviour and the crack initiates at the outer surface and grows to the inner surface of the three dimensional hollow structure 101. The structures can be made using additive manufacturing. Successful crack detection was obtained and moreover remarkable load levels were obtained for these particular examples.

By way of illustration, embodiments of the present invention not being limited thereto, some exemplary embodiments are further described, illustrating determination of the crack, wear or corrosion location. The hollow cavity structure, in the present embodiments forming one or more capillaries, is integrated near the component's surface and put under vacuum, underpressure or overpressure. If a crack, wear or corrosion phenomena propagates, and finally reaches the hollow cavity structure, several effects will occur inside and nearby the cavity. The problem of detecting a crack in the structure then boils down to investigating what happens inside the cavity. Detecting a crack/leak and its position inside the cavity can be performed using one of the following exemplary techniques. In a first set of exemplary embodiments, the location detection system is based on transient pressure waves. When a surface crack reaches the cavity, the leakage of the cavity in overpressure with respect to the outside world will cause a flow from the cavity to the outside or vice versa when the cavity is underpressured. As a result of the creation of this leak flow and the leak flow itself, the pressure inside the cavity will change. Due to the dynamic loading of the structure, the leak will be opened and closed during a loading cycle. The opening and closing of the leak, the creation of the leak flow and the leak flow itself will therefore typically cause a transient pressure wave to occur at the leakage point that propagates with the speed of sound. Using pressure sensors, the occurrence of pressure waves inside the cavity can be detected and an alarm signal can be sent when the surface crack reaches a certain depth/size. In addition to the transient pressure wave caused by the leakage, pressure variations can be caused by the volumetric change of the total cavity (or capillary) due to the loading of the component.

Figure 19:
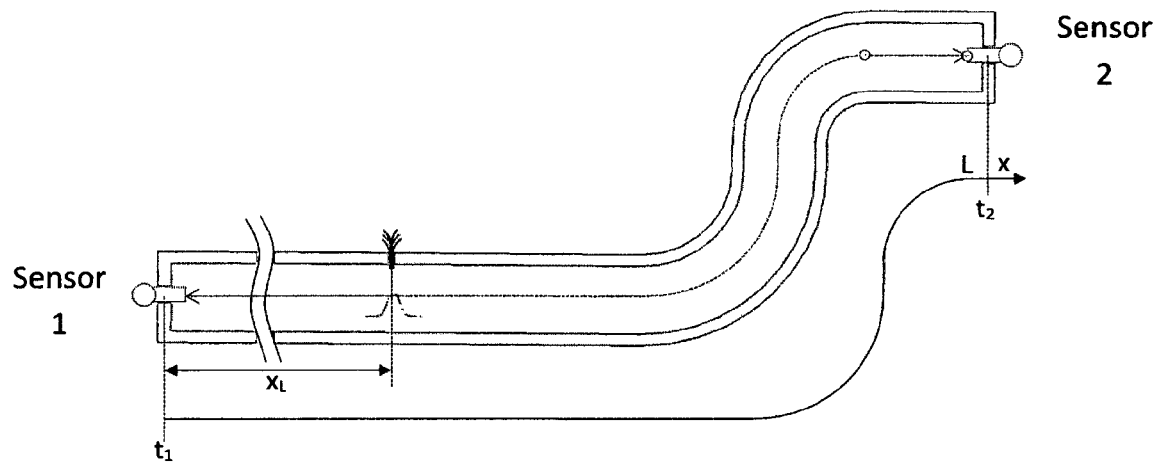
FIG. 19 illustrates a localization setup for localizing cracks based on detection of transient pressure waves, as can be used in embodiments of the present invention.

The setup can be extended by equipping the cavity with two (or more) pressure sensors at the ends of the cavity. The leak flow, as a result of the surface crack, will cause a transient pressure change that travels through the cavity with the speed of sound. As illustrate in FIG. 19, the two sensors will observe the pressure waves at a different moment in time, due to the different distances between the crack position and the position of the two pressure sensors. This time difference can be used to localize the crack position. FIG. 19 gives a schematic overview of the working principle. If for example an elongate cavity is used and the pressure wave is travelling in a length direction, the position of the crack can be determined as follows:

$$x_L = \frac{L - c_{sound} * \Delta t}{2}$$

with $x_L$ being the position along the length direction, L being the length of the cavity, $c_{sound}$ being the sound velocity and $\Delta t$ being the time-difference measurement. It thereby is to be noticed that an elongate cavity is a cavity extending mainly in a lengthwise direction. Such a lengthwise direction does not need to be according to a straight line but may be curved or hooked, The accuracy of the crack localization is determined by the accuracy of the time-difference measurement $\Delta t$ and the speed of sound. The sampling frequency must therefore be high enough (i.e. mm-range accuracy is obtained with a sampling frequency of 100 kHz, see the left table below for air). This method is in fact a time of flight method to localize crack or defects in the structure and similar to the negative pressure wave method applied to pipelines with the exception that there is no flow.

TABLE 1

| $f_{sample}$ | $\Delta t_{sample}$ | $\Delta x_{sample}$ $C_{air}$ = 343 m/s |
|---|---|---|
| 100 Hz | $10^{-2}$ s | 343 cm |
| 1 kHz | $10^{-3}$ s | 34.3 cm |
| 10 kHz | $10^{-4}$ s | 3.43 cm |
| 100 kHz | $10^{-5}$ s | 0.343 cm |
| 1 MHz | $10^{-6}$ s | 0.0343 cm |

Note that subsample accuracy is possible by the (maximum likelihood) identification of transfer functions with a time-delay. The application of such an approach has been reported for the localization of cable faults from a reflectogram by Pintelon et al. in IEEE Transactions on Instrumentation and measurement 39(3) (1990) pp 479-484 but the technique is also applicable in embodiments of the present invention. Another related approach consists in the use parametrically identified transmissibility functions. Transmissibility functions are a class of transfer functions that are particularly useful in the analysis of vibration transmission. A (scalar) transmissibility functions is a transfer function between two output signals, e.g., the transfer function between two measured pressure signals. By taking the ratio of the two output spectra, the common input spectra cancels in the ratio. This implies that the transmissibility function becomes nearly deterministic (i.e., independent of the noisy input source). The transmissibility function depends only on the location of the source. This property makes it possible to use transmissibility functions as a tool to localize a leak (due to a crack). The method can be generalized to multiple cracks by using multivariable transmissibility functions. Multivariable transmissibility functions have been discussed by Devriendt et al. for example in Mechanical systems and signal processing 24(5) (2010) pp 1250-1259.

Inverse methods, such as the weighted pseudo-inverse method, can also be used to detect the localization of an acoustic source. One example of a method that can be use is described by Guillaume P et al. in Proceedings of the society of photo-optical instrumentation engineers (SPIE) 4753 (2002) pp 1382. Inverse methods assume that the transfer functions between all possible source (crack) locations and the measured responses are known. The transfer functions can be measured or calculated by means of e.g. finite element methods. Inverse methods allow the detection multiple source (crack) locations.

In order to increase the accuracy even further, it could be beneficial to use other fluida (instead of air) in the cavity that have lower sound speeds. The same inaccuracy on the time will then cause a lower inaccuracy on the position detection. Examples of possible fluida are given in the table below:

TABLE 2

| Fluidum | Vsound [m/s] |
|---|---|
| Argon | 319 |
| Helium | 1007 |
| Krypton | 221 |
| Xenon | 169 |
| Hydrogen | 1270 |
| Nitrogen | 349 |
| Oxygen | 326 |
| CO2 | 267 |
| SO2 | 201 |
| Ethylene | 327 |
| Methaan | 446 |
| Propaan | 258 |

Note that the outwards leak flow causes a gradually decrease of the pressure inside the cavity. This pressure change time constant is mainly a function of the volume of the cavity (known) and the area of the leak. The size of the leak could be estimated on basis of the time constant of the leak phenomena.

In one particular embodiment, detection can be based on reflection. Based on the above principle, a pressure wave will travel in both directions to the ends of the cavity. Reflections could occur at the boundaries of the cavity, so that one sensor (mounted at 1 end of the cavity) will observe the direct as well as the reflected pressure waves. The time difference between arrivals of these pressure waves is an indication of the travel distance, and thus the location of the crack can be determined (as the length of the capillary is known).

Figure 20:
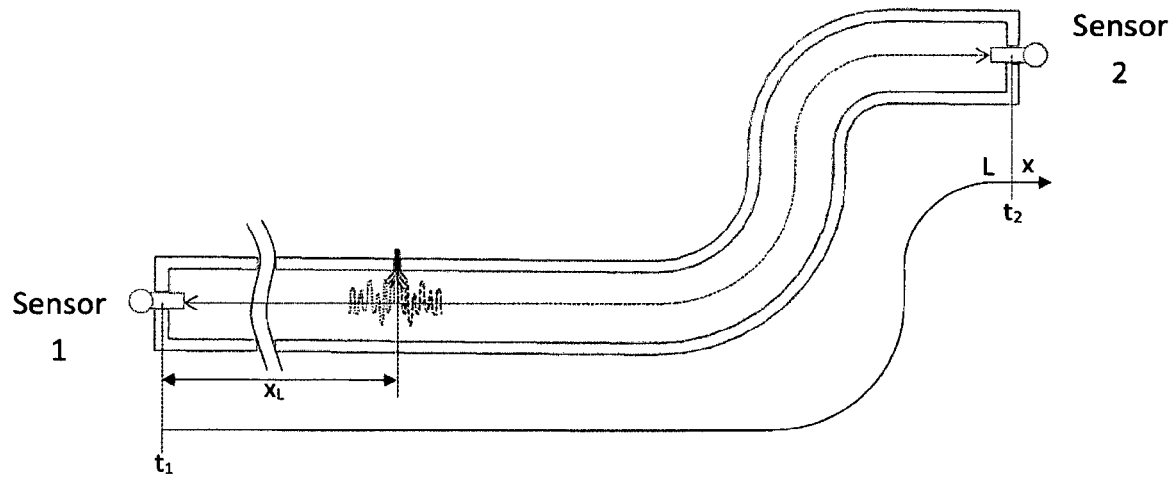
FIG. 20 illustrates a localization setup for localizing cracks based on acoustic or ultrasound detection, as can be used in embodiments according to the present invention.
Figure 21:
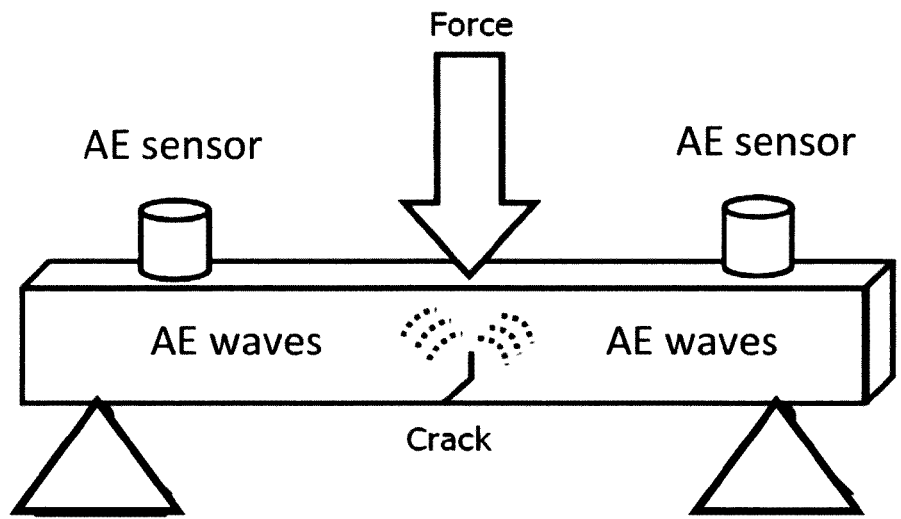
FIG. 21 illustrates acoustic emission detection for localizing cracks as can be used in embodiments of the present invention.

In a second set of particular embodiments, location detection is based on detection of acoustic and/or ultrasound noise signals in the fluidum and/or in the structure resulting from the changes that occur when a crack reaches a cavity and a leak flow occurs, that results in turbulences from the fluidum and causes the noise signal. Besides the leak flow the noise signal inside the cavity could also be caused by the acoustic energy released by structural degradation phenomena such as crack initiation, crack development etc. and captured by the cavity and transmitted towards the sensors. By listening to the acoustic and ultrasound noise by means of adequate sensors (pressure sensors, microphones, accelerometers, ultrasonic sensors, strain gauge, . . . ) one can detect the occurrence of a crack when it reaches the cavity. The same principle based on the difference in arrival time of the first ultrasound noise or the transmissibility approach allows for locating the crack. The principle is shown in FIG. 20. Negative pressure waves and ultrasound detection are based on the principle of detecting the leak flow to the cavity and thus only detect cracks that are large enough to reach the cavity. Crack initiation cannot be detected by these principles. Therefore, the methods can be assisted by acoustic emission to obtain some information about crack growth.

In a third set of particular embodiments, location detection is performed using acoustic emission detection. As crack growth emits noise in the structure, this can be detected by an Acoustic Emission (AE) sensor. The acoustic noise sources are classified depending on the amount of energy release in two classes: the microscopic and macroscopic sources. Relative grain movement, crack initiation and crack propagation were classified as macroscopic sources and release large amounts of energy. Dislocation movement, plastic deformation, phase transition, twinning, void formation, microcrack initiation were classified as micro crack sources. Different AE sensors, placed on the metal structure can detect the ultrahigh frequent noise. The amplitude of the noise corresponds the growth rate, the difference in time of arrival between different sensors can allow for crack position. This technique allows monitoring of the structural integrity of the structures. The effective structural health monitoring system can counteract the major drawback of acoustic emission the large amount of data that needs to be stored or processed. The detection method as exemplified by FIG. 11 can be used.

In yet other embodiments, in order to detect based on the above principles, also an ultrasound emitter may be present, e.g. integrated in or outside the cavity. The emitter can be set up on the outside of the cavity and the ultrasound can be detected then from the inside the cavity. The emitter then fakes the presence of the turbulences and the same system will be able to locate the hole where the ultrasound enters the cavity.

In another case, one can put the emitter on the one end of the cavity. The emitted ultrasound travels through the cavity and will escape the cavity through the leak. The difference in ultrasound level gives an indication of the size (and presence) of the leak.

More generally, a system for performing structural health monitoring of an object under study is described. The system comprises, according to at least some embodiments, a hollow cavity structure comprising one or more cavities, optionally obtained using additive manufacturing, the cavity structure being sealable from its environment and forming an integral part of the object under study. The system comprises a location detection means for detecting a location of wear or cracks or corrosion in the object under study. The location detection means may comprise at least one detector for detecting a first and a second physical signal representative of wear or a crack or crack initiation located at a particular position at the hollow cavity structure or in the structure. The physical signal may be for example a pressure wave or an ultrasound signal or an acoustic signal which are caused by the leak or by turbulence in the flow induced by the expansion of the leak. The physical signal can be representative of an acoustic energy wave, e.g. caused by wear or crack or crack initiation or corrosion. The acoustic energy wave thereby is created in the structure and is interacting with the cavity. The cavity or cavities then form(s) tentacles capturing the acoustic energy waves in the structure. The location detection means may comprise a single sensor, e.g. pressure sensor, positioned at a side of the cavity, the first physical signal being a signal representative of a wave received from the location where the crack or wear occurs and the second physical signal being representative of a wave received from the location where the crack or wear after it was first reflected at a wall of the cavity. In alternative embodiments, the location detection means also may comprise at least two pressure sensors, each sensor detecting a physical signal being representative of a wave received from the location where the crack or wear occurs.

The system also may comprise a processor for combining the first and the second signal for deriving a position of the wear or crack with reference to the cavity. The processor may be adapted for determining a differential signal.

The processor may be adapted for obtaining subsample accuracy using identification of transfer functions with a time-delay. Alternatively the processor also may be programmed for using parametrically identified transmissibility functions. The method can be generalized to multiple cracks by using multivariable transmissibility functions.

Inverse methods, such as the weighted pseudo-inverse method, can also be used to detect the localization, e.g. of an acoustic source.

As indicated above, the fluidum used in the cavity may be selected for optimally influencing the detection possibilities.

In some embodiments of the present invention an external source may be provided for inducing a pressure wave, an acoustic wave or an ultrasound wave in the object under study or the cavity.

These features may be combined with system for performing structural health monitoring of an object under study as described in one of the other aspects.

By way of illustration, embodiments of the present invention not being limited thereto, some exemplary embodiments are further described, illustrating determination of the crack, wear or corrosion precursor damage detection. Embodiments of the present invention disclosed hereabove use a direct damage indicator, the leakage of the internal pressure of a cavity to detect and localize the damage e.g. a crack. In some applications it is necessary to be able to detect smaller damage phenomena e.g. a smaller detectable crack length than practical feasible with the currently described structural health monitoring system. In some applications it will be even necessary to monitor damage precursors. A damage precursor is a structural material property that enables the monitoring of the progression towards a damage initiation before actual damage is present. For example, for a fatigue crack possible damage precursors can be dislocation movement, formation of slip bands and micro cracks, etc.

The acoustic emission techniques mentioned above have the capability to detect a number of these damage precursors due to their production of acoustic noise. The acoustic noise sources are classified depending on the amount of energy release in two classes: the microscopic and macroscopic sources. Relative grain movement, crack initiation and crack propagation were classified as macroscopic sources and release large amounts of energy. Dislocation movement, plastic deformation, phase transition, twinning, void formation, micro crack initiation were classified as micro crack sources.

It is an advantage that the system according to embodiments of the present invention can be extended optionally with an acoustic emission system that allows to detect acoustic emissions from multiple location within the monitored component with a small reduction in signal strength (attenuation) which creates a significant increase in the signal to noise ratio with a limited amount of acoustic emission sensors. The attenuation is a principal limitation for the acoustic emission technique. This improvement is due to the fact that the acoustic emission signal is captured by the system within the proximity of the source and transported (guided) towards the acoustic emission sensor without significant attenuation. The attenuation is typically due to numerous reflections of the acoustic emission wave, scattering of the acoustic wave at structural boundaries and attenuation due to geometrical spreading.

Figure 22:
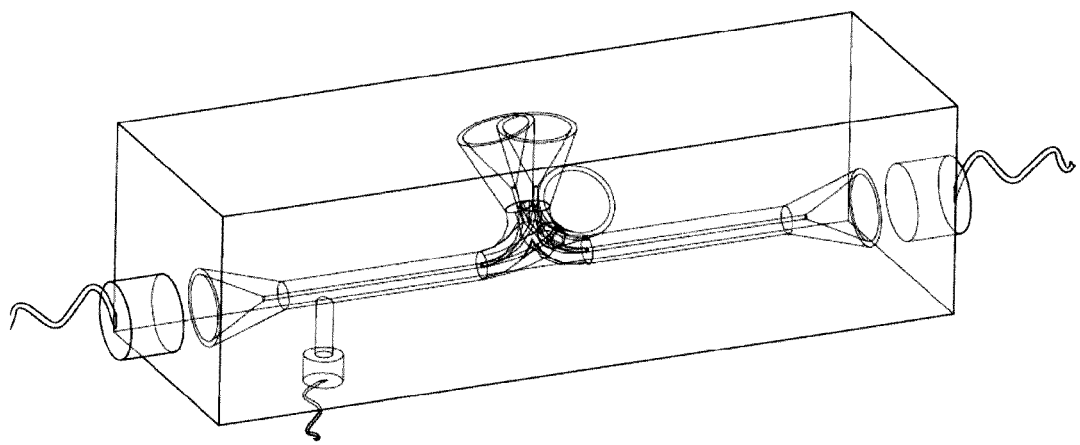
FIG. 22 and FIG. 23 show structural health monitoring for early damage detection or precursor detection in a 3D illustration (FIG. 22) and for a section view of the middle plane (FIG. 23) as can be used in embodiments according to the present invention.
Figure 23:
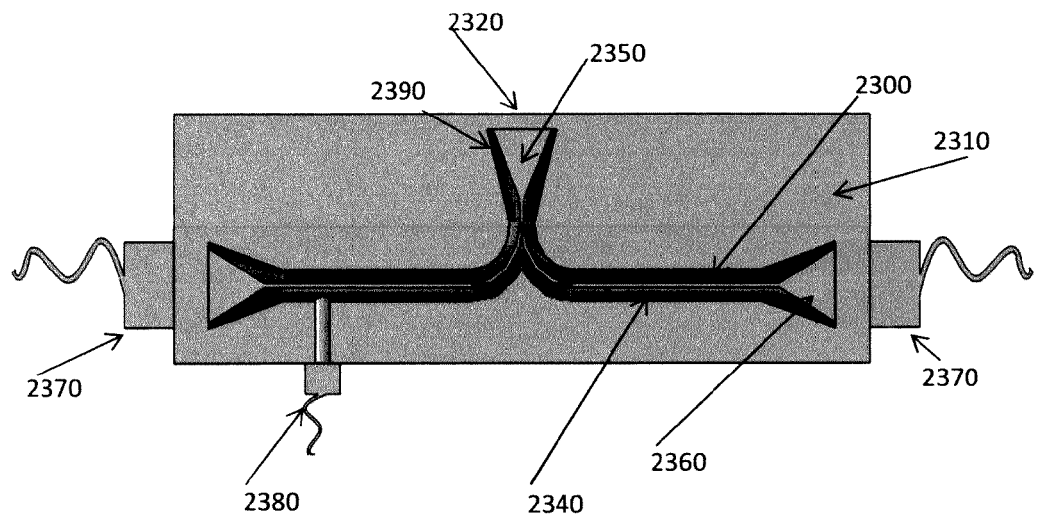

In a first embodiment of the present invention which requires early damage detection or even precursor detection is shown in FIG. 22 and FIG. 23. In FIG. 22 a 3-D schematic representation is shown and in FIG. 23 a 2 D section view of the illustration.

The device has a cavity 2300 which is an integral part of the component 2310. The cavity 2300 (enlarged on the schematic for the clarity) consists of a capillary 3 D network structure with on a number of locations (only shown one here in the middle of the part for the clarity of the schematic) in the vicinity of an acoustic emission source points 2320 conically shaped end pieces 2390. These end pieces are provided in multiple orientations. These orientations can be shaped depending on the expected angular section with the highest acoustic emission radiation amplitude. Depending on the application other types of internal cavity structures can be foreseen. On the inside of these cavity structures an internal structure is provided that consist of a wire or rod or a capillary 2340 filled with a fluid for the capillary sections of the outer cavity. This internal structure allows the acoustic emission wave to propagate without geometrical spreading, limited internal reflections and with a low absorption. The geometrical spreading is significantly reduced due to the fact that a gas is present between the internal structure and the cavity. This gas acts as an acoustic or ultrasonic isolator in this manner the acoustic emission wave propagates in the internal structure without geometrical spreading. The reflections are limited due to the fact that all transitions of direction are done smoothly. At the end pieces of these wires, rods or capillaries in the vicinity of the acoustic emission sources an ultrasonic/acoustic lens devices are provided to focus the acoustic emission wave into the wire, rod or capillary (represented by cones in the schematic), this enables the system to introduce the energy from a larger surface into the wire, rod or capillary efficiently with limited internal reflections. In FIG. 23, an acoustic ultrasonic focus lens 2350 and an acoustic ultrasonic collimator 2360 are shown. The pressure sensor 2380 and the conically shaped end pieces cavity 2390 are also visible. To obtain a low attenuation these wires, rods or capillaries are connected to the lens devices with a metallurgical, ceramic or polymeric connection depending on the material of the wire, rod or capillary and the lens device and form one integral part of one material type. The lens device is also connected to the component with a metallurgical, ceramic or polymeric connection. The internal structure will typically be made of a metal due to its low acoustic absorption. If the component is metallic the connection between the internal structure and the component will be metallurgical which means that the internal structure and component will form an integral part again. At the end points where the acoustic emission sensor 2370 are installed a lens device (also represented by cones in the schematic) will be foreseen to create a collimated acoustic emission wave efficiently on the installed sensor surface. It is an advantage that the acoustic emission sensor doesn't have to be installed in close proximity of the acoustic emission source and on an easy maintainable location. The cavity structure can be connected to a pressure transducer to monitor the internal pressure of the cavity structure to detect possible crack or wear that have propagated until reaching the cavity structure. The cavity structure and internal structure will be partly produced with additive manufacturing or a combination of subtractive and additive manufacturing.

Figure 24:
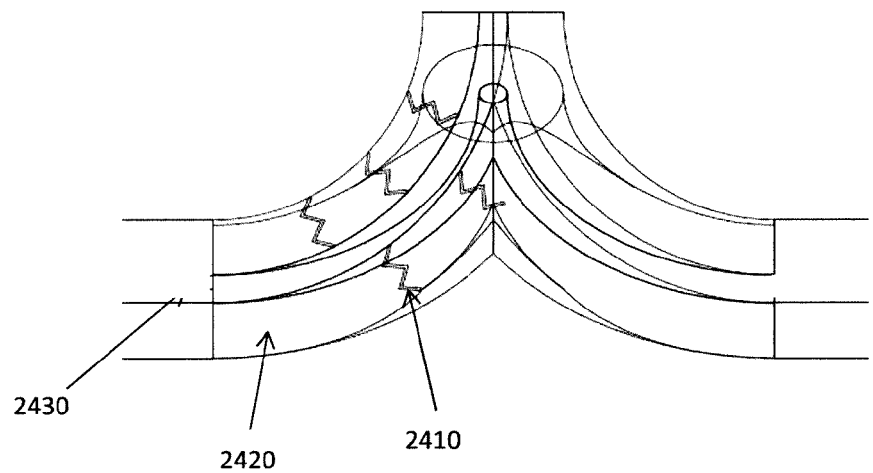
FIG. 24 illustrates a detail of a corner cavity with an elastic element, as can be used in embodiments according to the present invention.

To support the internal wires, rods or capillaries at specific point such as a corner (as shown in FIG. 24) elastic elements (e.g. a spring) can be applied. These elastic elements cause a limited attenuation of the acoustic wave energy. An elastic element 2410, the cavity 2420 and the wire/rod/capillary are shown.

Figure 25:
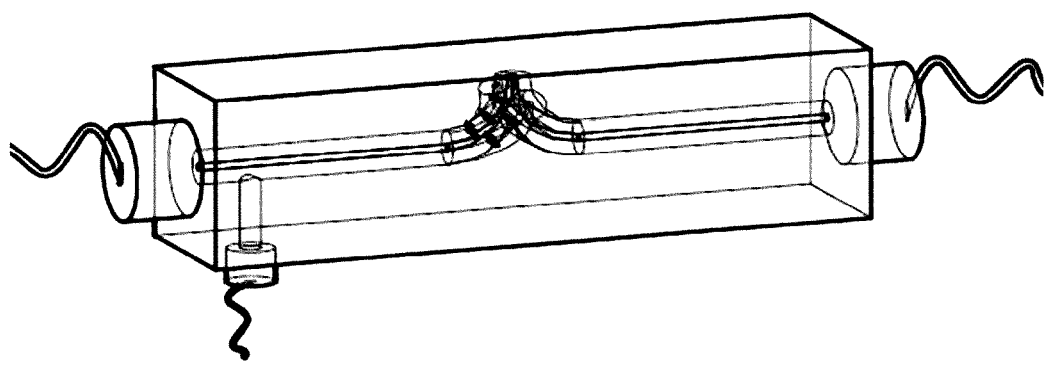
FIG. 25 and FIG. 26 shows structural health monitoring for early damage detection or precursor detection without lenses in a 3D illustration (FIG. 25) and for a section view of the middle plane (FIG. 26) as can be used in embodiments according to the present invention.
Figure 26:
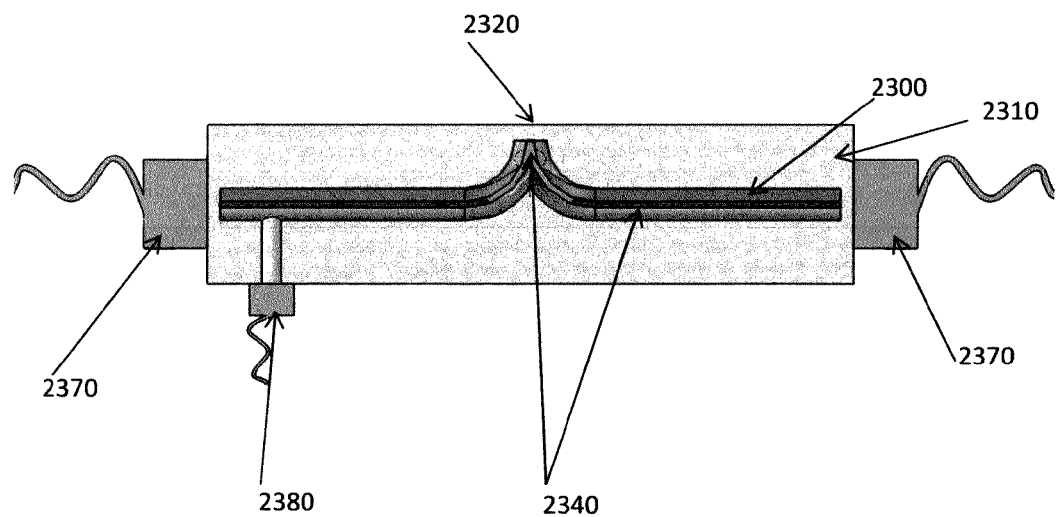

In a second embodiment of the present invention which requires early damage detection or even precursor detection is shown in FIG. 25 and FIG. 26. This embodiment is similar to the first embodiment with the exception that the internal structure doesn't have any lens devices.

Figure 27:
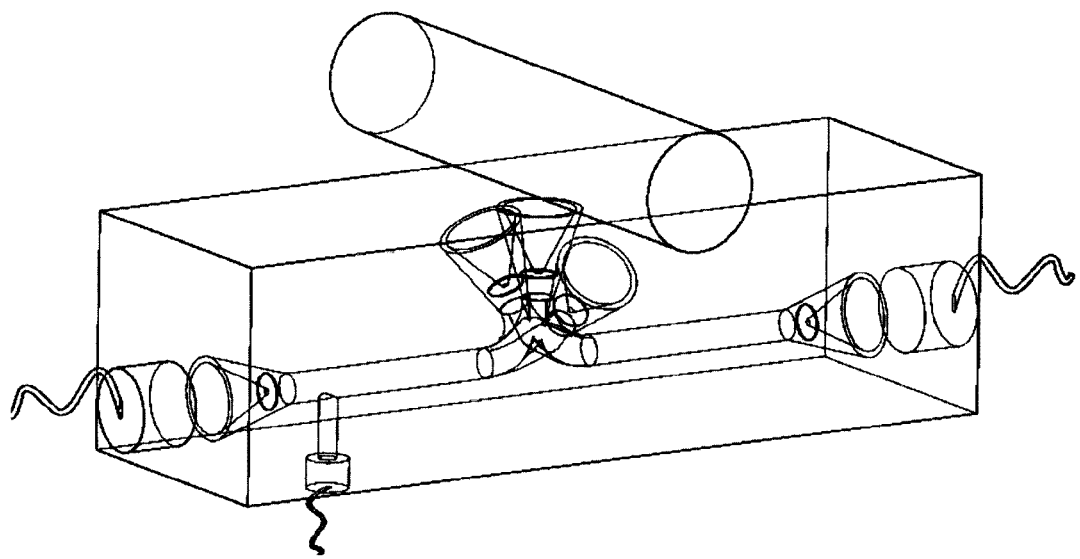
FIG. 27 and FIG. 28 shows structural health monitoring for early damage detection or precursor detection without wire/rod/capillary in a 3D illustration (FIG. 27) and for a section view of the middle plane (FIG. 28) as can be used in embodiments according to the present invention.
Figure 28:
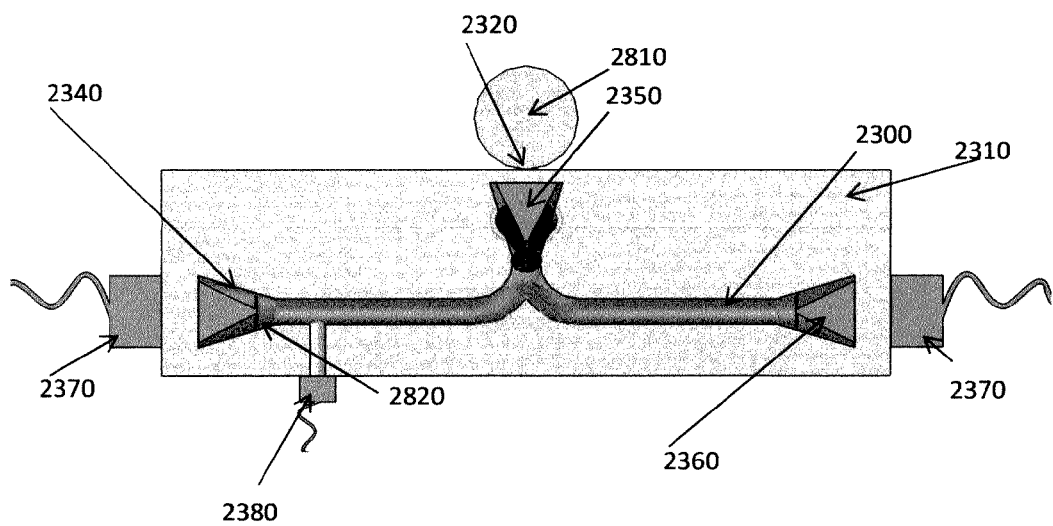

In a third embodiment of the present invention which requires early damage detection or even precursor detection is shown in FIGS. 27 and 28. This embodiment is similar to the first embodiment with the exception that the internal structure doesn't have any wires, rods or capillaries to propagate the acoustic emission wave. The propagation is done in this embodiment by the fluid that is used inside the cavity structure. At the end of focusing acoustic/ultrasonic lenses a structure can be foreseen that will vibrate on its Eigen frequency to increase the sensitivity of the required frequency range. In FIG. 28, the loading cylinder 2810 and the structure with specific eigen frequency 2820

Figure 29:
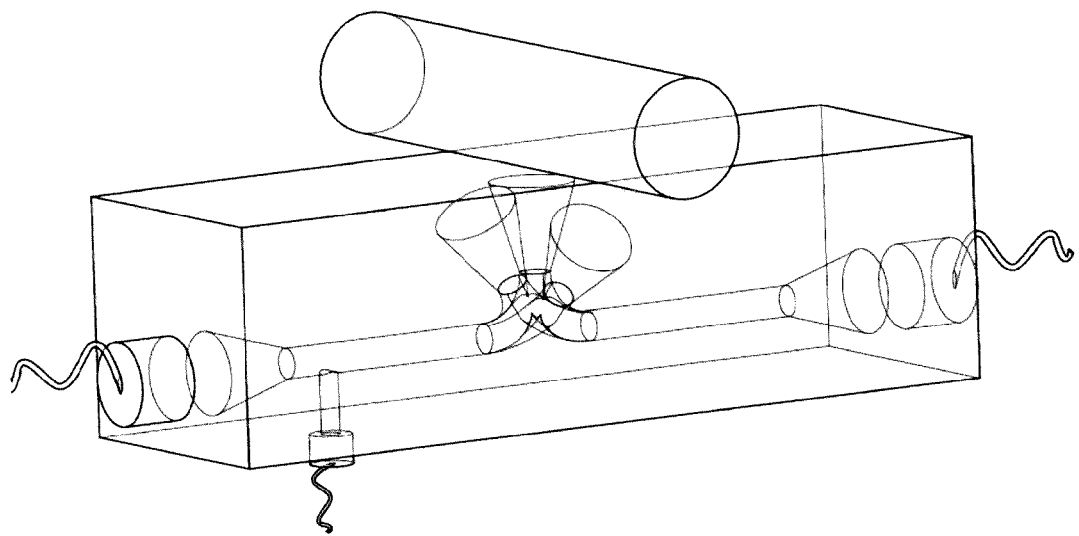
FIG. 29 and FIG. 30 shows structural health monitoring for early damage detection or precursor detection without lens or wire/rod/capillary in a 3D illustration (FIG. 29) and for a section view of the middle plane (FIG. 30) as can be used in embodiments according to the present invention.
Figure 30:
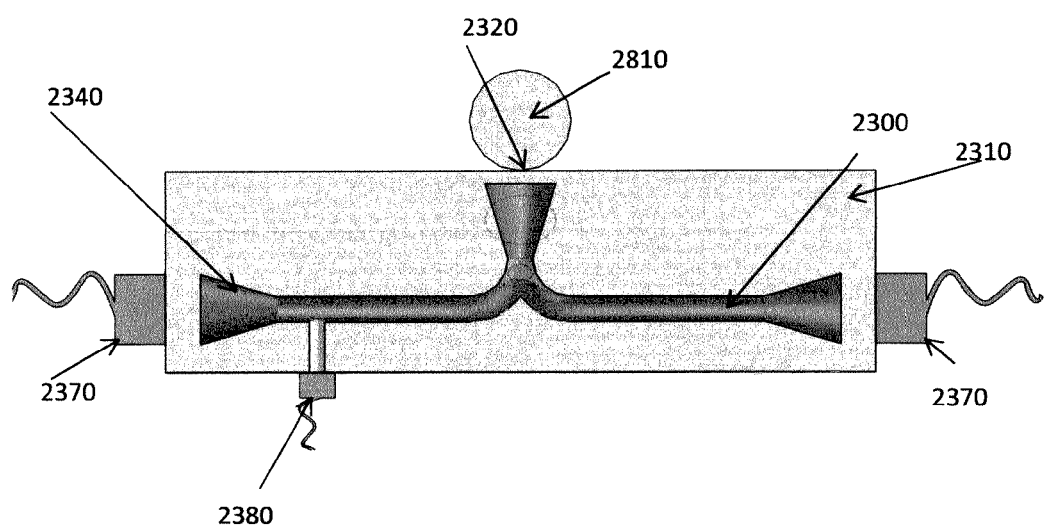

In a fourth embodiment of the present invention which requires early damage detection or even precursor detection is shown in FIG. 29 and FIG. 30. This embodiment is similar to the third embodiment with the exception that the internal structure doesn't have any lens devices.

The application of at least two acoustic emission sensors allows also localizing the origin of the acoustic emission source, this is an advantage compared to general acoustic emission sensor where at least 3 sensors are required to localize the acoustic emission location. The localization capability will be necessary to monitor multiple damage phenomena at the same time. It is an advantage of the current proposed system that multiple locations can be monitored which is not so straight forward with the standard acoustic emission techniques and finally the pressure sensor system provides a second system backup system with embedded physical memory.

The invention claimed is:

1. A system for performing structural health monitoring of an object under study, the system comprising:
   a hollow cavity structure comprising one or more cavities obtained using additive manufacturing,
   a pressure sensor for sensing a pressure in the cavity structure, the pressure sensor being attached to an inside wall of the hollow cavity structure or the pressure sensor being arranged outside the hollow cavity structure and being connected to the hollow cavity structure,
   wherein the system is perfectly closed and free from external devices including at least a vacuum tank, a vacuum pump and high impedance flow device, and
   wherein the cavity structure
      is inherently sealed from its environment, and
      forms an integral part of the object under study,
      the one or more cavities being at a pressure different from an ambient pressure, and the one or more cavities being configured to maintain the pressure different from the ambient pressure permanently as long as the monitored system does not fail and induce a breech into the hollow cavity.

2. A system according to claim 1, wherein at least one cavity of the hollow cavity structure can be described as a volume forming a straight cavity, being a 2D cavity or being a 3D cavity, the volume being defined by propogating an area, defined by a closed two dimensional curve, along at least one spatial path, with the path propagating in at least a two dimensional space.

3. A system according to claim 2, wherein the area varies for at least a number of points of the path.

4. A system according to claim 1, wherein at least one cavity of the hollow cavity structure can be described as a volume forming a straight cavity, being a 2D cavity or being a 3D cavity, the volume being defined by propogating an area, defined by a closed two dimensional curve, along at least one spatial path, with the path propagating in an at least three dimensional space.

5. A system according to claim 1, wherein at least one cavity of the hollow cavity structure comprises an internal truss structure therein.

6. A system according to claim 1, whereby the hollow cavity structure is filled with a fluidum at under- or over-pressure.

7. A system according to claim 1, wherein the system furthermore comprises a processing unit adapted for receiving measurement signals representative of a physical parameter of the fully integrated hollow cavity structure and for processing said measurement signals for detecting whether or not wear or cracks or corrosion have occurred in the object under study.

8. A system according to claim 7, the system comprising said processing unit,
   wherein the measurement signals are pressure induced signals and wherein the processing unit is adapted for processing said pressure induced signals in such a way as to detect pressure changes in the hollow cavity structure, and for deriving from said pressure changes whether or not wear or cracks have occurred in the object under study.

9. A system according to claim 7, the system comprising said processing unit, wherein the processing unit is adapted for receiving data of acoustic emission signals from the hollow cavity structure or the object itself and for deriving from said data whether or not wear or cracks have occurred in the object under study.

10. A system according to claim 7, the system comprising said processing unit, wherein the processing unit is adapted for receiving ultrasonic wave data of ultrasonic waves passing over the surfaces of the hollow cavity structure and for deriving from said ultrasonic wave data whether or not wear or cracks have occurred in the object under study.

11. A system according to claim 1, wherein the cavities of the system comprise a liquid penetrant for visualizing wear or cracks using the naked eye and/or an imaging system.

12. A system according to claim 1, wherein the pressure sensor is a pressure sensor configured for determining the absolute pressure in the hollow cavity structure.

13. A system according to claim 1, wherein the hollow cavity structure is filled with a fluid at under-pressure, and at least one of the one or more cavities of the hollow cavity structure has a triangular cross-section.

\* \* \* \* \*